US011343063B2

(12) United States Patent
Takeda et al.

(10) Patent No.: US 11,343,063 B2
(45) Date of Patent: May 24, 2022

(54) USER TERMINAL AND RADIO COMMUNICATION METHOD

(71) Applicant: NTT DOCOMO, INC., Tokyo (JP)

(72) Inventors: Kazuaki Takeda, Tokyo (JP); Kazuki Takeda, Tokyo (JP); Satoshi Nagata, Tokyo (JP)

(73) Assignee: NTT DOCOMO, INC., Tokyo (JP)

( * ) Notice: Subject to any disclaimer, the term of this patent is extended or adjusted under 35 U.S.C. 154(b) by 79 days.

(21) Appl. No.: 16/763,117

(22) PCT Filed: Nov. 16, 2017

(86) PCT No.: PCT/JP2017/041361
§ 371 (c)(1),
(2) Date: May 11, 2020

(87) PCT Pub. No.: WO2019/097649
PCT Pub. Date: May 23, 2019

(65) Prior Publication Data
US 2020/0295913 A1    Sep. 17, 2020

(51) Int. Cl.
*H04L 5/14* (2006.01)
*H04L 5/00* (2006.01)
*H04W 72/04* (2009.01)

(52) U.S. Cl.
CPC .......... *H04L 5/1469* (2013.01); *H04L 5/0082* (2013.01); *H04W 72/0413* (2013.01); *H04W 72/0453* (2013.01)

(58) Field of Classification Search
CPC ......... H04W 72/0453; H04W 72/0446; H04W 72/0413; H04L 5/0082; H04L 27/26025; H04L 5/001; H04L 5/0094; H04L 5/1469; H04L 5/0098
See application file for complete search history.

(56) References Cited

U.S. PATENT DOCUMENTS

| | | | | |
|---|---|---|---|---|
| 2012/0257551 | A1* | 10/2012 | Diao | H04W 72/048 370/280 |
| 2017/0064676 | A1* | 3/2017 | Lee | H04B 7/04 |
| 2019/0380041 | A1* | 12/2019 | Taori | H04W 16/10 |
| 2020/0059345 | A1* | 2/2020 | Pelletier | H04L 1/1657 |
| 2020/0120675 | A1* | 4/2020 | Li | H04L 5/0055 |
| 2020/0267583 | A1* | 8/2020 | Cheng | H04W 48/16 |

(Continued)

OTHER PUBLICATIONS

Extended European Search Report issued in counterpart European Patent Application No. 17931836.5, dated May 6, 2021 (10 pages).

(Continued)

*Primary Examiner* — Brian D Nguyen
(74) *Attorney, Agent, or Firm* — Osha Bergman Watanabe & Burton LLP

(57) ABSTRACT

A user terminal is disclosed including a transmitting/receiving section that performs transmission and reception by Time Division Duplex (TDD) by using a DL/UL frequency band pair that has a UL frequency band and a DL frequency band configured in a frequency direction in a carrier; and a control section that performs control to switch between a first DL/UL frequency band pair and a second DL/UL frequency band pair, and performs the transmission and the reception. In another aspect, a radio communication method of a user terminal is also disclosed.

12 Claims, 16 Drawing Sheets

(56) References Cited

U.S. PATENT DOCUMENTS

| | | | | |
|---|---|---|---|---|
| 2020/0295878 A1* | 9/2020 | Choi | ................ | H04W 72/1273 |
| 2020/0351946 A1* | 11/2020 | Pang | ................ | H04W 74/006 |
| 2020/0367253 A1* | 11/2020 | Kim | ................ | H04W 72/0493 |
| 2020/0389282 A1* | 12/2020 | Turtinen | ................ | H04L 5/0092 |
| 2021/0092739 A1* | 3/2021 | Choi | ................ | H04W 72/0446 |
| 2021/0136697 A1* | 5/2021 | Fu | ................ | H04W 52/325 |
| 2021/0242993 A1* | 8/2021 | Choi | ................ | H04L 5/0051 |

OTHER PUBLICATIONS

Samsung; "Power saving for wideband carrier in NR"; 3GPP TSG-RAN WG2 NR #99bis Meeting, R2-1711200; Prague, Czech; Oct. 9-13, 2017 (6 pages).

NTT Docomo, Inc.; "Remaining issues on bandwidth parts for NR"; 3GPP TSG RAN WG1 Meeting 90bis, R1-1718223; Prague, Czech, Oct. 9-13, 2017 (4 pages).

InterDigital, Inc., "Remaining details of BWP"; 3GPP TSG RAN WG1 Meeting AH_NR#3, R1-1716258; Nagoya, Japan, Sep. 18-21, 2017 (6 pages).

Huawei, HiSilicon, "Bandwidth part activation and adaptation"; 3GPP TSG RAN WG1 Meeting #90bis, R1-1717905; Prague, Czech Republic, Oct. 9-13, 2017 (7 pages).

International Search Report issued in PCT/JP2017/041361 dated Feb. 6, 2018 (2 pages).

Written Opinion of the International Searching Authority issued in PCT/JP2017/041361 dated Feb. 6, 2018 (4 pages).

Huawei, HiSilicon; "Bandwidth part activation and adaptation"; 3GPP TSG RAN WG1 Meeting NR Ad Hoc #3, R1-1715571; Nagoya, Japan; Sep. 18-21, 2017 (5 pages).

MediaTek Inc.; "Remaining Details on Bandwidth Part Operation in NR"; 3GPP TSG RAN WG1 Meeting 90bis, R1-1718327; Prague, CZ; Oct. 9-13, 2017 (13 pages).

3GPP TS 36.300 V8.12.0; "3rd Generation Partnership Project; Technical Specification Group Radio Access Network; Evolved Universal Terrestrial Radio Access (E-UTRA) and Evolved Universal Terrestrial Radio Access Network (E-UTRAN); Overall description; Stage 2 (Release 8)"; Mar. 2010 (149 pages).

Office Action issued in the counterpart European Patent Application No. 17931836.5, dated Dec. 9, 2021 (5 pages).

* cited by examiner

USER TERMINAL AND RADIO COMMUNICATION METHOD

TECHNICAL FIELD

The present invention relates to a user terminal and a radio communication method of a next-generation mobile communication system.

BACKGROUND ART

In Universal Mobile Telecommunications System (UMTS) networks, for the purpose of higher data rates and lower latency, Long Term Evolution (LTE) has been specified (Non-Patent Literature 1). Furthermore, for the purpose of wider bands and a higher speed than those of LTE, LTE successor systems (also referred to as, for example, LTE Advanced (LTE-A), Future Radio Access (FRA), 4G, 5G; 5G+ (plus), New RAT (NR), and LTE Rel. 14 and 15~) have been also studied.

Furthermore, legacy LTE systems (e.g., LTE Rel. 8 to 13) perform communication on Downlink (DL) and/or Uplink (UL) by using subframes of 1 ms as a scheduling unit. The subframe includes 14 symbols of 15 kHz in subcarrier-spacing in a case of, for example, a Normal Cyclic Prefix (NCP). The subframe is also referred to as, for example, a Transmission Time Interval (TTI).

Furthermore, a user terminal (UE: User Equipment) controls reception of a DL data channel (also referred to as, for example, a PDSCH: Physical Downlink Shared Channel or a DL shared channel) based on Downlink Control Information (DCI) (also referred to as, for example, a DL assignment) from a radio base station (e.g., eNB: eNodeB). Furthermore, the user terminal controls transmission of a UL data channel (also referred to as, for example, a PUSCH: Physical Uplink Shared Channel or a UL shared channel) based on DCI (also referred to as, for example, a UL grant) from the radio base station.

CITATION LIST

Non-Patent Literature

Non-Patent Literature 1: 3GPP TS 36.300 V8.12.0 "Evolved Universal Terrestrial Radio Access (E-UTRA) and Evolved Universal Terrestrial Radio Access Network (E-UTRAN); Overall description; Stage 2 (Release 8)", April 2010

SUMMARY OF INVENTION

Technical Problem

It has been studied for a future radio communication system (e.g., NR) that a user terminal monitors (blind-decodes) a control resource domain (e.g., Control Resource Set (CORESET)) that is a candidate domain to which a DL control channel (e.g., PDCCH: Physical Downlink Control Channel) is allocated, and receives (detects) DCI.

Furthermore, it has been studied for the future radio communication system to use one or more partial frequency bands (also referred to as partial bands and Bandwidth Parts (BWPs)) in a carrier (also referred to as, for example, a Component Carrier (CC) or a system band) for DL and/or UL communication (DL/UL communication).

Thus, in a case where one or more frequency bands (e.g., BWPs) used for DL/UL communication in a carrier is made configurable, it is considered to activate and/or deactivate (activate/deactivate) the frequency band.

Furthermore, it is considered that one or more BWPs are configured, and radio communication is performed by Time Division Duplex (TDD) or Frequency Division Duplex (FDD) by using this BWP. When, for example, TDD is performed, a UL BWP (UL frequency band) and a DL BWP (DL frequency band) are configured in one BWP, and DL/UL frequency band pairs (DL/UL BWP pairs) are specified. It is preferred to appropriately perform radio communication by TDD by using these DL/UL BWP pairs.

The present invention has been made in light of this point, and one of objects of the present invention is to provide a user terminal and a radio communication method that appropriately perform radio communication by TDD by using DL/UL frequency band pairs (DL/UL BWP pairs) that have UL frequency bands and DL frequency bands configured in a frequency direction in a carrier.

Solution to Problem

One aspect of a user terminal includes: a transmitting/receiving section that performs transmission and reception by Time Division Duplex (TDD) by using a DL/UL frequency band pair that has a UL frequency band and a DL frequency band configured in a frequency direction in a carrier; and a control section that performs control to switch between a first DL/UL frequency band pair and a second DL/UL frequency band pair, and perform the transmission and the reception, the first DL/UL frequency band pair having a UL frequency band and a DL frequency band that share a center frequency, and being configured unevenly on an upper limit frequency side or a lower limit frequency side in a frequency band of the carrier, the second DL/UL frequency band pair having a UL frequency band and a DL frequency band at least one of which has a wider bandwidth than a bandwidth of the first DL/UL frequency band pair, and the at least one of the UL frequency band and the DL frequency band having a frequency band including a frequency band of the first DL/UL frequency band pair.

Advantageous Effects of Invention

According to the present invention, it is possible to appropriately perform radio communication by TDD by using DL/UL frequency band pairs (DL/UL BWP pairs) that have UL frequency bands and DL frequency bands partially configured in a frequency direction in a carrier.

DESCRIPTION OF EMBODIMENTS

It has been studied for a future radio communication system (e.g., NR, 5G or 5G+) to allocate a carrier (also referred to as, for example, a Component Carrier (CC), a cell or a system band) of a bandwidth (e.g., 100 to 800 MHz) wider than those of legacy LTE systems (e.g., LTE Rel. 8 to 13).

On the other hand, the future radio communication system is assumed to include a mix of user terminals (also referred to as, for example, Wideband (WB) UEs or single carrier WB UEs) that have capability for performing transmission and/or reception (transmission/reception) in the entire carrier, and user terminals (also referred to as, for example, BW reduced UEs) that do not have capability for performing transmission/reception in the entire carrier.

Thus, the future radio communication system is assumed to include a mix of a plurality of user terminals of different supporting bandwidths (various BW UE capabilities). Therefore, it has been studied to semi-statically configure one or more partial frequency bands in a carrier. Each frequency band (e.g., 50 MHz or 200 MHz) in the carrier will be referred to as, for example, a partial band or a Bandwidth Part (BWP).

Figure 1A:
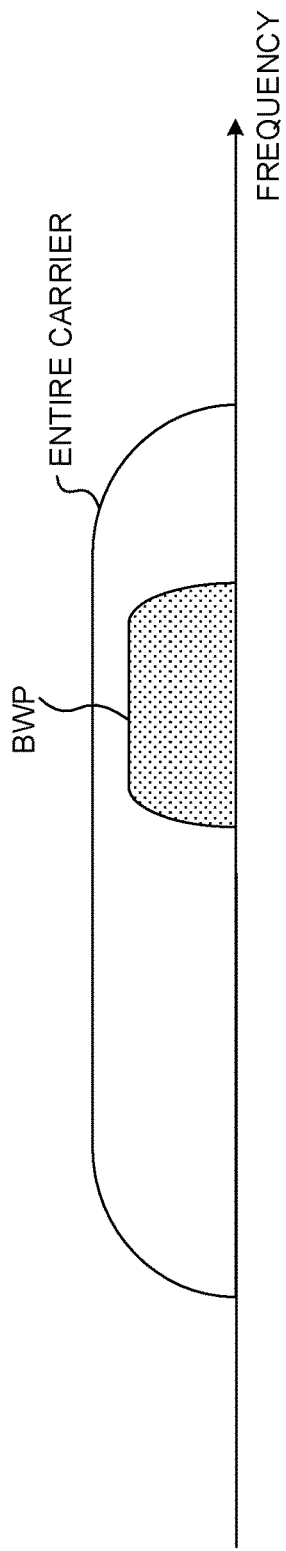
FIGS. 1A to 1C are diagrams illustrating one example of a BWP configuration scenario.

FIG. 1 is a diagram illustrating one example of a BWP configuration scenario. FIG. 1A illustrates a scenario (usage scenario #1) that 1 BWP is configured to a user terminal in 1 carrier. In, for example, FIG. 1A, a BWP of 200 MHz is configured in the carrier of 800 MHz. Activation or deactivation of the BWP may be controlled.

In this regard, activation of the BWP refers to a state where the BWP is available (or refers to making a transition to the available state), and will be also referred to as, for example, activation or enabling of configuration information of a BWP (BWP configuration information). Furthermore, deactivation of the BWP refers to a state where the BWP is unavailable (or refers to making a transition to the unavailable state), and will be also referred to as, for example, deactivation or disabling of the BWP configuration information.

Figure 1B:
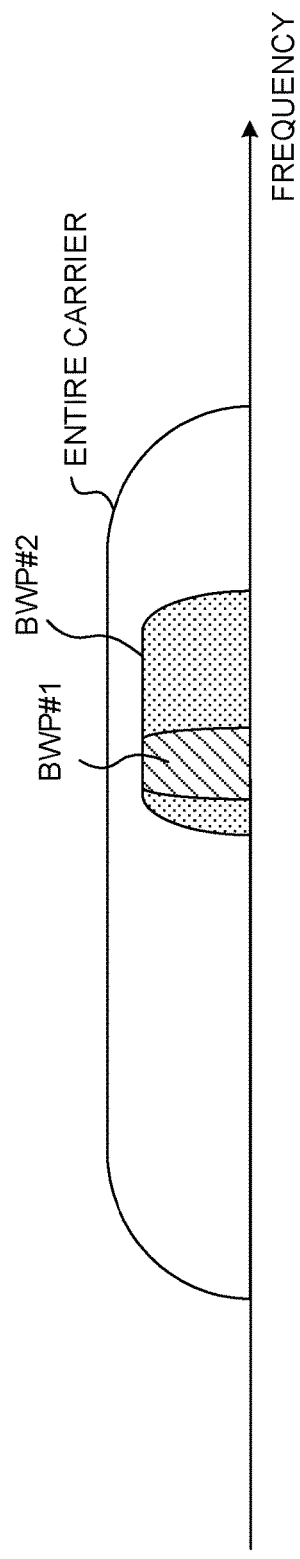

FIG. 1B illustrates a scenario (usage scenario #2) that a plurality of BWPs are configured to the user terminal in 1 carrier. As illustrated in FIG. 1B, at least part of a plurality of these BWPs (e.g., BWPs #1 and #2) may overlap. In, for example, FIG. 1B, the BWP #1 is a frequency band that is part of the BWP #2.

Furthermore, activation or deactivation of at least one of a plurality of these BWPs may be controlled. Furthermore, the number of BWPs to be activated at a certain time may be restricted (e.g., only 1 BWP may be active at the certain time). For example, in FIG. 1B, only one of the BWPs #1 and #2 is active at the certain time.

In, for example, FIG. 1B, when data is not transmitted or received, the BWP #1 may be activated, and, when data is transmitted or received, the BWP #2 may be activated. More specifically, when there is data to be transmitted or received, the BWP #1 may be switched to the BWP #2, and, when transmission or reception of the data is finished, the BWP #2 may be switched to the BWP #1. Consequently, the user terminal does not need to monitor the BWP #2 of a wider bandwidth than that of the BWP #1 at all times, so that it is possible to suppress power consumption.

In addition, in FIGS. 1A and 1B, a network (e.g., radio base station) may not assume that the user terminal performs reception and/or transmission outside a BWP in an active state. In addition, in FIG. 1A, the user terminal that supports the entire carrier is not prevented from receiving and/or transmitting a signal outside the BWP at all.

Figure 1C:
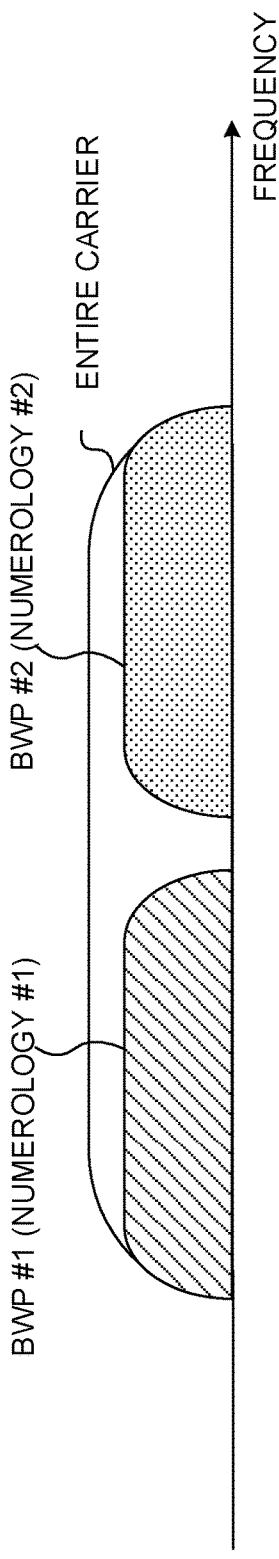

FIG. 1C illustrates a scenario (usage scenario #3) that a plurality of BWPs are configured to different bands in 1 carrier. As illustrated in FIG. 1C, different numerologies may be applied to a plurality of these BWPs. In this regard, the numerology may be at least one of a subcarrier-spacing, a symbol length, a slot length, a Cyclic Prefix (CP) length, a slot (Transmission Time Interval (TTI)) length, and the number of symbols per slot.

In, for example, FIG. 1C, the BWPs #1 and #2 of the different numerologies are configured to the user terminal having capability for performing transmission/reception in the entire carrier. In FIG. 1C, at least one BWP configured to the user terminal may be activated or deactivated, and one or more BWPs may be active at a certain time.

In addition, a BWP used for DL communication may be referred to as a DL BWP (DL frequency band), and a BWP used for UL communication may be referred to as a UL BWP (UL frequency band). At least part of frequency bands of the DL BWP and the UL BWP may overlap. Hereinafter, the DL BWP and the UL BWP will be collectively referred to as a BWP when not distinguished.

At least one of DL BWPs (e.g., a DL BWP included in a primary CC) configured to the user terminal may include a control resource domain that is a DL control channel (DCI) allocation candidate. The control resource domain may be referred to as a Control Resource Set (CORESET), a control subband, a search space set, a search space resource set, a control domain, a controlling subband or an NR-PDCCH domain.

The user terminal monitors one or more search spaces in the CORESET, and detects DCI for the user terminal. The search space may include a Common Search Space (CSS) in which DCI (e.g., group DCI or common DCI) that is common between one or more user terminals is arranged, and/or a User terminal (UE)-specific Search Space (USS:

UE-specific Search Space) in which user terminal-specific DCI (e.g., a DL assignment and/or a UL grant) is arranged.

The user terminal may receive configuration information of a CORESET (CORESET configuration information) by using a higher layer signaling (e.g., Radio Resource Control (RRC) signaling). The CORESET configuration information may indicate at least one of, for example, a frequency resource (e.g., the number of RBs and/or a start RB index), a time resource (e.g., start OFDM symbol number), a time duration, a Resource Element Group (REG) bundle size (REG size), a transmission type (e.g., interleave or non-interleave) and a periodicity (e.g., a monitoring periodicity per CORESET) of each CORESET.

Figure 2:
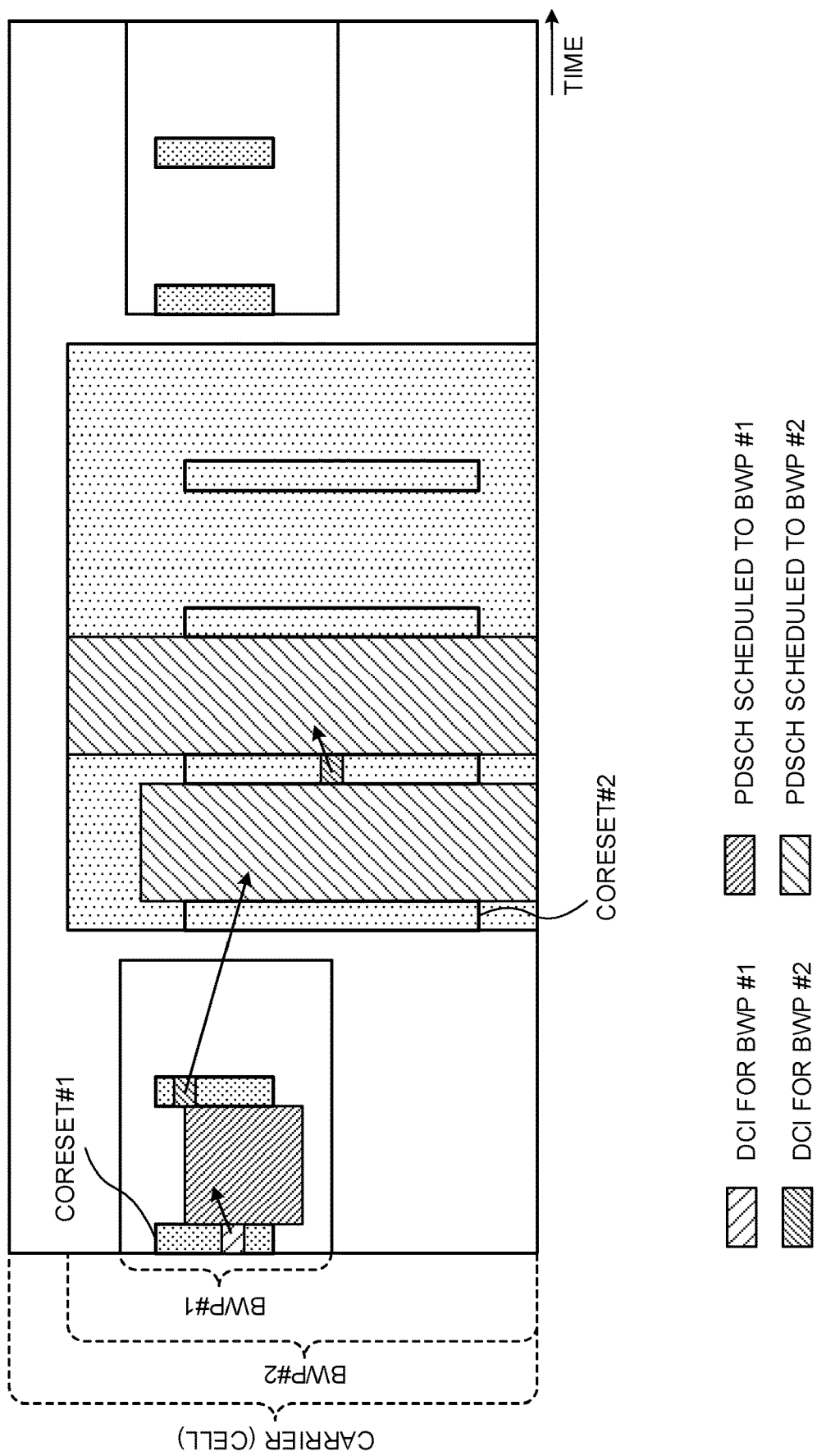
FIG. 2 is a diagram illustrating one example of control of activation/deactivation of a BWP.

Control of activation and/or deactivation (also referred to as, for example, activation/deactivation, switching or determination) of a BWP will be described with reference to FIG. 2. FIG. 2 is a diagram illustrating one example of control of activation/deactivation of the BWP. In addition, FIG. 2 assumes the scenario illustrated in FIG. 1B. However, control of activation/deactivation of the BWP is applicable to, for example, the scenarios illustrated in FIGS. 1A and 1C, too, as appropriate.

Furthermore, in FIG. 2, a CORESET #1 is configured in the BWP #1, and a CORESET #2 is configured in the BWP #2. One or more search spaces are respectively provided for the CORESET #1 and the CORESET #2. For example, DCI for the BWP #1 and DCI for the BWP #2 may be arranged in an identical search space or may be arranged in respectively different search spaces in the CORESET #1.

Furthermore, in FIG. 2, when the BWP #1 is in an active state, the user terminal monitors (blind-decodes) the search space in the CORESET #1 of a given periodicity (e.g., per one or more slots, per one or more mini slots or per given number of symbols), and detects DCI for the user terminal.

The DCI may include information (BWP information) indicating which BWP the DCI is for. The BWP information may be, for example, a BWP index and a given field value in the DCI. Furthermore, the BWP index information may be included in DCI for scheduling on downlink, may be included in DCI for scheduling on uplink, or may be included in DCI of the common search space. The user terminal may determine a BWP to which a PDSCH or a PUSCH is scheduled by the DCI, based on the BWP information in the DCI.

When detecting the DCI for the BWP #1 in the CORESET #1, the user terminal receives the PDSCH scheduled (allocated) to given time and/or frequency resources (time/frequency resources) in the BWP #1 based on the DCI for the BWP #1.

Furthermore, when detecting the DCI for the BWP #2 in the CORESET #1, the user terminal deactivates the BWP #1, and activates the BWP #2. The user terminal receives the PDSCH scheduled to the given time/frequency resources of the DL BWP #2 based on the DCI for the BWP #2 detected in the CORESET #1.

In addition, in FIG. 2, the DCI for the BWP #1 and the DCI for the BWP #2 are detected in the CORESET #1 at different timings. However, a plurality of pieces of DCI of different BWPs may be made detectable at an identical timing. For example, a plurality of search spaces respectively associated with a plurality of BWPs in the CORESET #1 may be provided, and a plurality of pieces of DCI of respectively different BWPs may be transmitted in a plurality of these search spaces. The user terminal may monitor a plurality of search spaces in the CORESET #1, and detect a plurality of pieces of DCI of different BWPs at an identical timing.

When the BWP #2 is activated, the user terminal monitors (blind-decodes) the search space in the CORESET #2 of a given periodicity (e.g., per one or more slots, per one or more mini slots or per given number of symbols), and detects the DCI for the BWP #2. The user terminal may receive the PDSCH scheduled to the given time/frequency resources of the BWP #2 based on the DCI for the BWP #2 detected in the CORESET #2.

In addition, FIG. 2 illustrates a given time for switching to activation or deactivation. However, the given time may not be provided.

When detection of the DCI for the BWP #2 in the CORESET #1 triggers activation of the BWP #2 as illustrated in FIG. 2, it is possible to activate the BWP #2 without explicit instruction information, and consequently prevent an increase in an overhead accompanying control of activation.

On the other hand, in FIG. 2, even when the user terminal fails (misses) detection of the DCI for the BWP #2 (i.e., the DCI for activation of the BWP #2) in the CORESET #1, the radio base station cannot recognize the failure of the detection. Hence, even though the user terminal continues monitoring the CORESET #1 of the BWP #1, there is a risk that the radio base station erroneously recognizes that the BWP #2 is available for the user terminal, and transmits, in the CORESET #2, DCI for scheduling a PDSCH in the BWP #2.

In this case, when the radio base station cannot receive transmission acknowledgement information (also referred to as, for example, HARQ-ACK, ACK/NACK or A/N) of the PDSCH in the given duration, the radio base station may recognize that the user terminal has failed detection of the DCI for activation of the BWP #2, and retransmit the DCI for activation in the CORESET #1. Alternatively, although not illustrated in FIG. 2, a common CORESET may be provided to the BWPs #1 and #2.

Furthermore, when a data channel (e.g., the PDSCH and/or the PUSCH) is not scheduled in the activated BWP for a given duration, the BWP may be deactivated. In, for example, FIG. 2, the PDSCH is not scheduled in the DL BWP #2 for the given duration, and therefore the user terminal deactivates the BWP #2 and activates the BWP #1.

The user terminal may configure a timer in an activated BWP every time reception of a data channel (e.g., a PDSCH and/or a PUSCH) is finished, and deactivate the BWP when the timer expires. The timer may be a timer (also referred to as, for example, a joint timer) that is common between DL BWPs and UL BWPs, or may be a dedicated timer.

When the timer is used for deactivation of a BWP, it is not necessary to transmit explicit instruction information for deactivation, so that it is possible to reduce an overhead accompanying control of deactivation.

By the way, a maximum number of BWPs that is configurable per carrier may be defined in advance. According to, for example, Frequency Division Diplex (FDD) (paired spectrum), four DL BWPs at maximum and four UL BWPs at maximum may be respectively configured per carrier.

On the other hand, according to Time Division Duplex (TDD) (unpaired spectrum), four pairs of DL BWPs and UL BWPs at maximum may be configured per carrier. In this regard, according to TDD, the DL BWP and the UL BWP that form a pair may have an identical center frequency and different bandwidths.

A single carrier has been described above. However, a plurality of carriers (also referred to as, for example, cells or serving cells) may be aggregated (e.g., Carrier Aggregation (CA) and/or Dual Connectivity (DC)). As described above, one or more BWPs only need to be configured to at least one of a plurality of these carriers.

When a plurality of cells are aggregated by CA or DC, a plurality of these cells may include a Primary cell (P cell) and one or more Secondary cells (S cells). The P cell may support a single carrier (CC), and include one or more BWPs. Furthermore, each S cell may support a single carrier (CC), and include one or more BWPs.

Each BWP of the P cell may be provided with a common search space for a random access procedure (RACH: Random Access Channel Procedure). Similarly, each BWP of the P cell may be provided with a common search space for fallback, a common search space for paging or a common search space for Remaining Minimum System Information (RMSI).

Furthermore, each BWP of one or more cells (the P cell and/or the S cells) may be provided with a common search space for a PDCCH (group-common PDCCH) that is common between one or more user terminals.

Furthermore, a specific BWP may be defined in advance for the user terminal. For example, a BWP (initial active BWP) to which a PDSCH for conveying system information (e.g., RMSI: Remaining Minimum System Information) is scheduled may be specified by a frequency position and a bandwidth of a CORESET on which DCI for scheduling the PDSCH is arranged. Furthermore, a numerology identical to the RMSI may be applied to the initial active BWP.

Furthermore, a BWP that is default (default BWP) may be defined for the user terminal. The default BWP may be the above-described initial active BWP or may be configured by a higher layer signaling (e.g., RRC signaling).

Next, control of activation/deactivation of a BWP in the S cell will be described. Based on a result of inter-frequency measurement of the user terminal, the radio base station configures the S cell to the user terminal, and configures one or more BWPs in the S cell to the user terminal.

Figure 3:
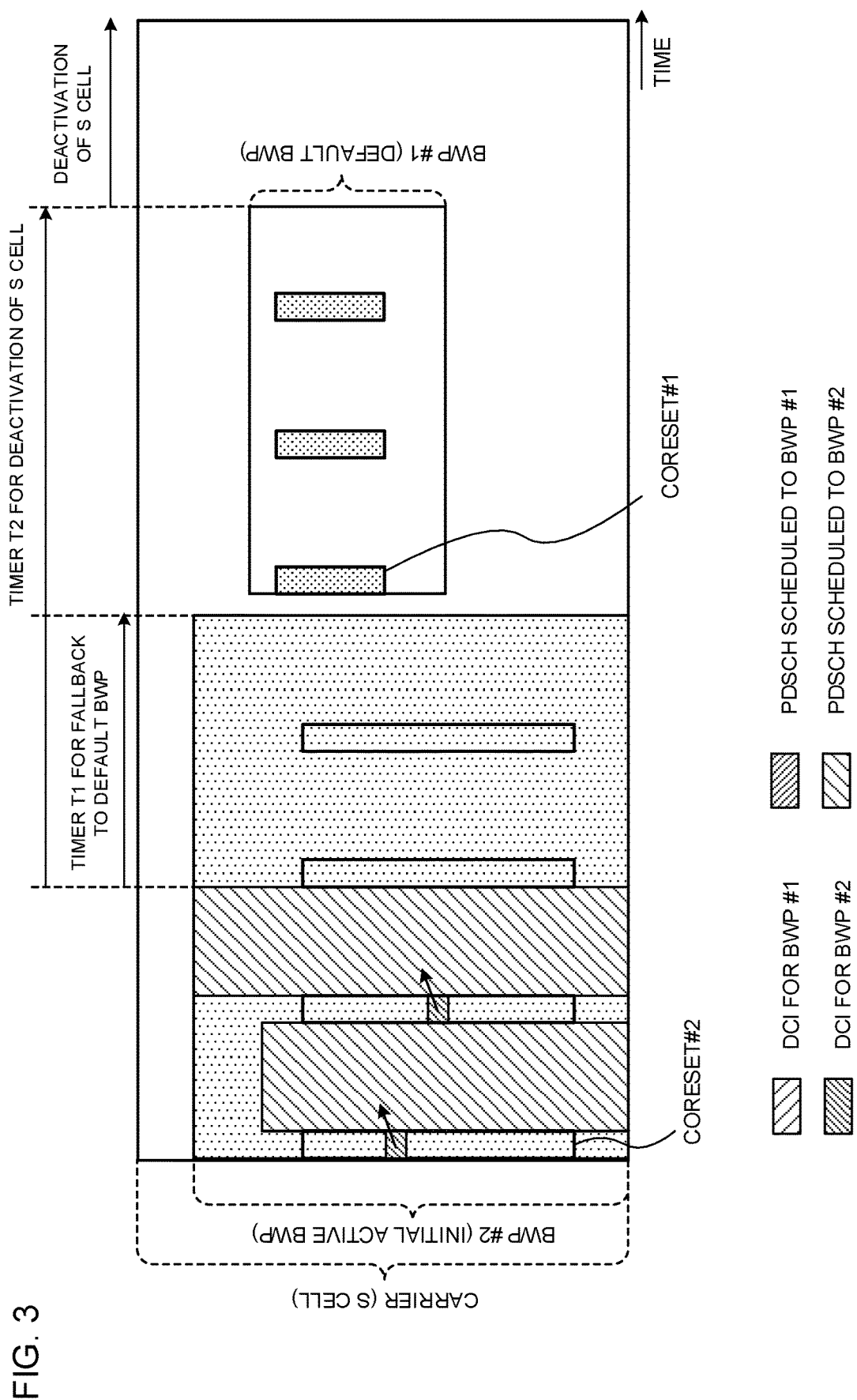
FIG. 3 is a diagram illustrating one example of control of activation or deactivation of one or more BWPs in an S cell.

FIG. 3 is a diagram illustrating one example of control of activation or deactivation of one or more BWPs in the S cell. In FIG. 3, the BWPs #1 and #2 in the S cell are configured to the user terminal. However, this example is only one example, and the present invention is not limited to this.

As illustrated in FIG. 3, a BWP of a wider bandwidth among a plurality of BWPs to be configured to the user terminal may be configured as an initial active BWP in the S cell. The initial active BWP may be notified from the radio base station to the user terminal by a higher layer signaling (e.g., RRC signaling).

For example, in FIG. 3, the BWP #2 having a wider bandwidth than that of the BWP #1 may be configured (notified) as the initial active BWP to the user terminal. Furthermore, in FIG. 3, the BWP #1 that is different from initial active BWP is configured (notified) as a default BWP to the user terminal. However, the initial active BWP and the default BWP may be configured to an identical BWP.

For example, in FIG. 3, the user terminal may activate a timer T1 for switching (fallback) to the default BWP and a timer T2 for deactivation of the S cell every time reception of a PDSCH in the BWP #2 is finished. For example, a duration of the timer T2 is configured longer than a duration of the timer T1.

In FIG. 3, the user terminal monitors (blind-decodes) a search space in the CORESET #1 of the BWP #1 at a given periodicity even after activation of the timers T1 and T2, yet does not detect DCI, and then the timer T1 expires. When the timer T1 expires, the user terminal deactivates the BWP #2 that is the initial active BWP, and activates the BWP #1 that is the default BWP.

The user terminal monitors (blind-decodes) a search space in the CORESET #1 of the activated BWP #1 at a given periodicity, yet does not detect DCI, and then the timer T2 expires. When the timer T2 expires, all BWPs are deactivated, and the S cell is deactivated.

As described above, when all BWPs of the S cell are deactivated or when the S cell is implicitly deactivated, it is possible to reduce a signaling overhead for deactivation of the S cell.

By the way, as described above, it is considered to configure one or a plurality of BWPs, and perform radio communication by Time Division Duplex (TDD) by using the configured BWPs. When, for example, TDD is performed, a UL BWP (UL frequency band) and a DL BWP (DL frequency band) are configured in one BWP, and a DL/UL frequency band pair (DL/UL BWP pair) is specified.

When frequency bands (e.g., the UL BWP, the DL BWP and the DL/UL BWP pair) of different bandwidths are used during TDD, there is a probability that the user terminal switches a certain frequency band to another frequency band. In this case, there is a probability that the user terminal needs to perform so-called RF retuning for reconfiguring bands. It is not possible to perform either transmission of a UL signal or reception of a DL signal in a RF retuning gap.

Hence, to reduce or eliminate RF retuning, it has been studied to match a center frequency of a switch source frequency band and a center frequency of a switch target frequency band. In an example illustrated in, for example, FIG. 4, two DL/UL BWP pairs (a DL/UL BWP pair #1 and a DL/UL BWP pair #2) are configured in a carrier.

Figure 4:
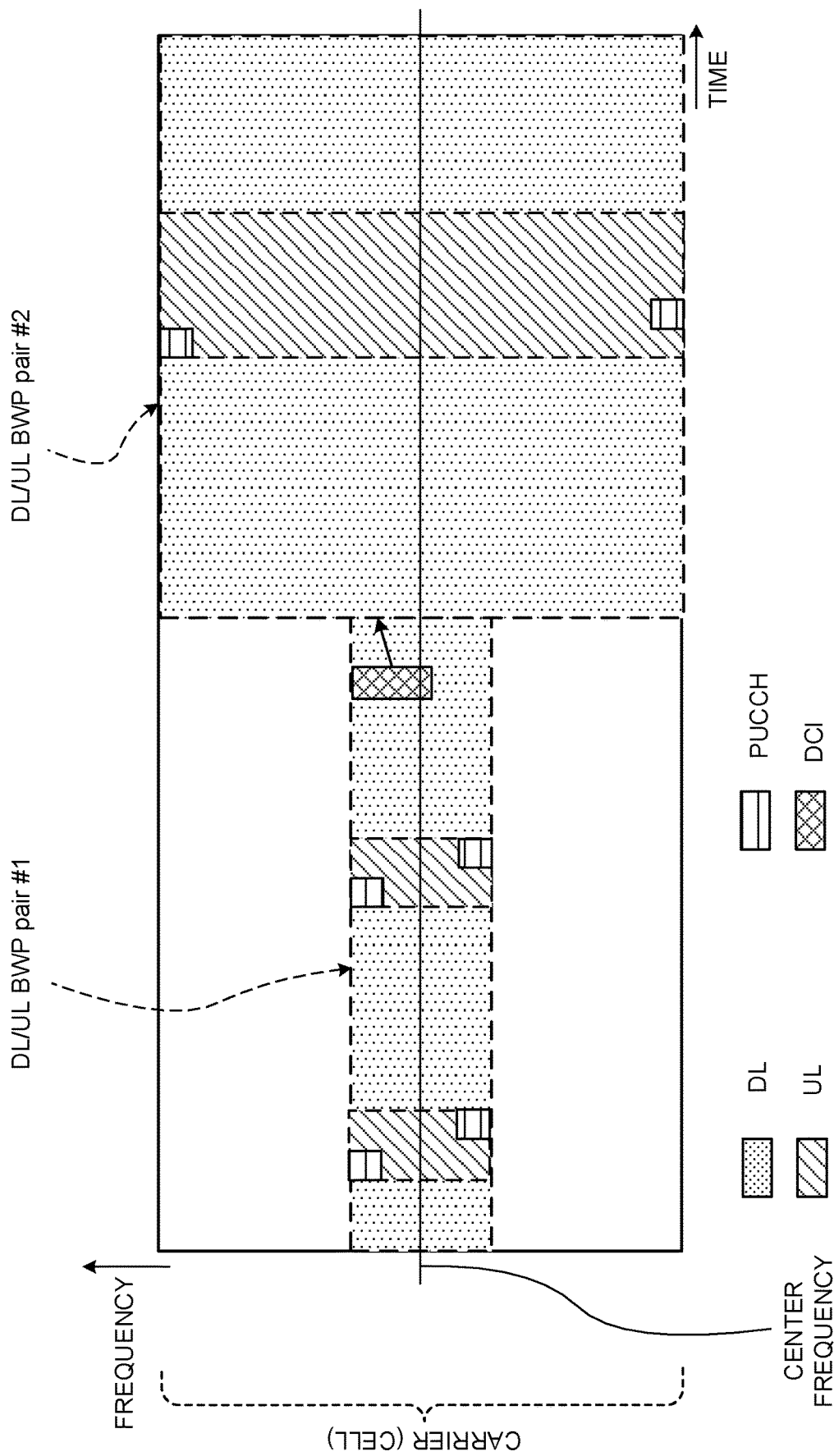
FIG. 4 is a diagram for explaining radio communication by TDD that uses different DL/UL BWP pairs.

In FIG. 4, a narrower bandwidth than that of the DL/UL BWP pair #2 is configured to the DL/UL BWP pair #1. Furthermore, the bandwidth of the DL/UL BWP pair #2 is configured equally to a bandwidth of the carrier. On the other hand, a center frequency of the DL/UL BWP pair #1 and a center frequency of the DL/UL BWP pair #2 are configured to the same frequency. Consequently, it is possible to switch between the DL/UL BWP pairs without performing RF retuning.

In addition, in the example in FIG. 4, the UL BWP and the DL BWP are configured to the same bandwidth in the DL/UL BWP pair #1. Similarly, the UL BWP and the DL BWP are configured to the same bandwidth in the DL/UL BWP pair #2, too. That is, the center frequency of the UL BWP and the center frequency of the DL BWP are configured to the same frequency in both of the DL/UL BWP pairs #1 and #2.

On the other hand, when the bandwidths of the DL BWP and the UL BWP are matched, and the user terminal performs radio communication by TDD by using a DL/UL BWP pair to which a narrow bandwidth has been configured, there is a risk that contiguous uplink resource allocation is restricted (uplink resources are divided) in another user terminal. Hereinafter, this uplink resource allocation restriction will be described.

When a radio base station communicates with a plurality of user terminals during radio communication to which TDD has been applied, time domains of UL BWPs are common between a plurality of these user terminals during UL transmission. When, for example, a certain user terminal is performing radio communication on UL by using the UL BWP of the DL/UL BWP pair #1 illustrated in FIG. 4, there is a probability that another user terminal is also performing radio communication on UL in the same time domain as that of the above UL BWP.

A more specific situation will be assumed. When a certain user terminal is performing radio communication on UL by using the UL BWP of the DL/UL BWP pair #1, there is a probability that another user terminal is performing radio communication on UL by using a DL/UL BWP pair having a wider bandwidth than the bandwidth of the DL/UL BWP pair #1.

When, for example, UL radio communication is being performed by using a UL BWP, uplink control information (PUCCH) to be periodically transmitted is arranged (configured) in UL BWP resources (FIG. 4). In addition, a reason why two PUCCH resources are configured to one UL BWP in FIG. 4 is that Frequency Hopping (FH) is applied to obtain a frequency diversity effect.

By the way, in a case where data is transmitted on uplink, UL radio communication supports allocating the data to contiguous resources in a frequency direction, and then transmitting the data. In this regard, when a user terminal allocates the radio resources to the data, it is not possible to multiplex the data on the radio resources to which a PUCCH has been allocated by a user terminal other than the own user terminal.

Now back to the above-described specific situation, a case is assumed where, when a certain user terminal is performing radio communication (including periodic PUCCH transmission) on UL by using the UL BWP of the DL/UL BWP #1, another user terminal transmits UL data by using a wider bandwidth than the bandwidth of the DL/UL BWP pair #1. In this case, the above another user terminal needs to avoid radio resources to which a PUCCH has been allocated, and arrange the UL data on radio resources. Hence, contiguous uplink resource allocation is restricted (contiguous uplink resources are divided) for the above another user terminal, and there is a probability that the another user terminal cannot transmit the UL data.

Hence, the inventors of this application have focused on arrangement positions of DL/UL BWP pairs in a carrier, and configurations of a DL BWP and a UL BWP included in the DL/UL BWP pair, studied appropriately performing radio communication that uses TDD, and reached the present invention.

One embodiment of the present invention will be described below with reference to the drawings. In addition, in aspects and a modified example described below, two DL/UL BWP pairs are configured. However, the number of pairs to be configured is not limited to this.

(First Aspect)

Figure 5:
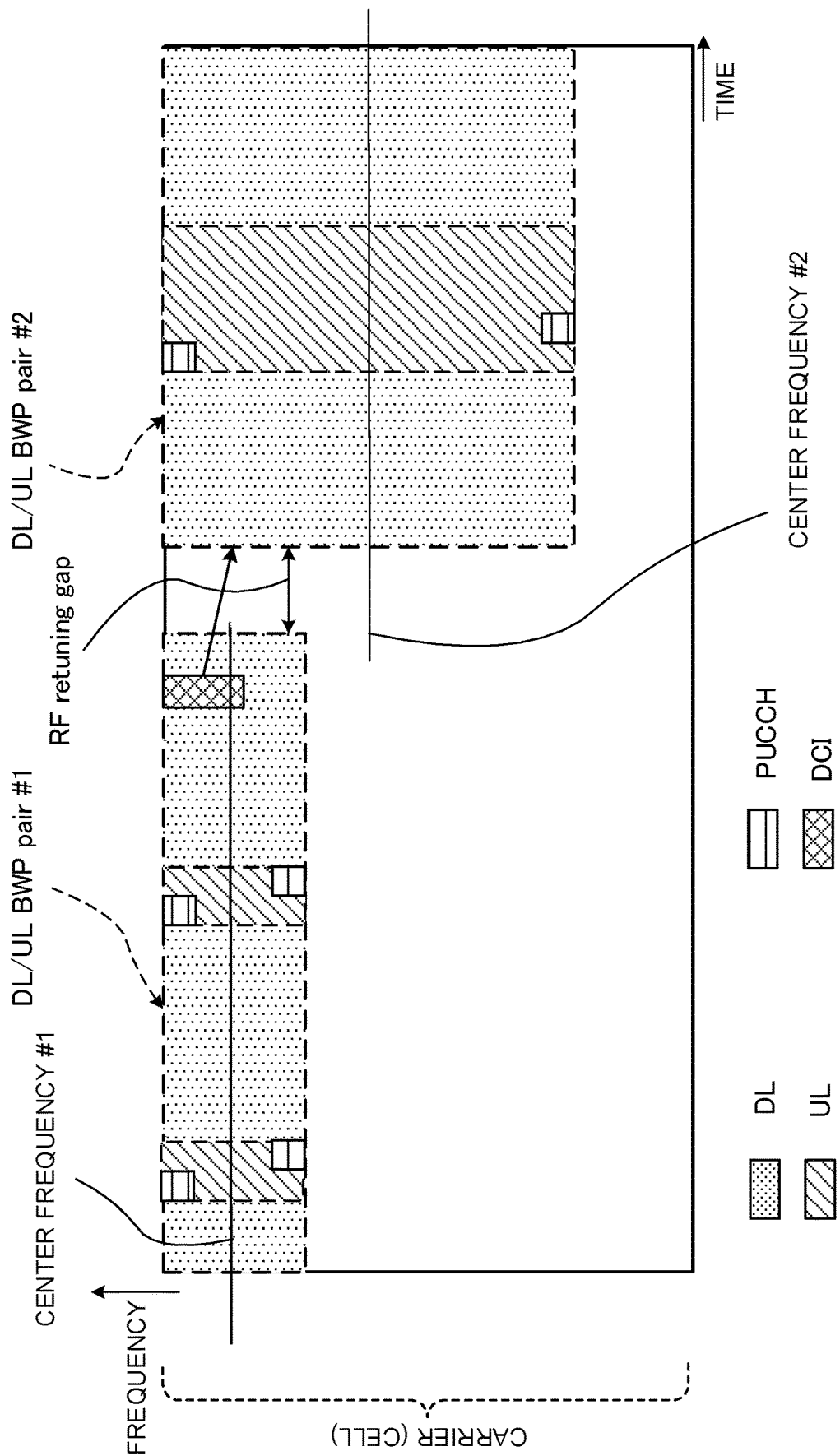
FIG. 5 is a diagram for explaining radio communication by TDD that uses a DL/UL BWP pair according to a first aspect.

The first aspect will be described first with reference to FIG. 5. In FIG. 5, DL/UL BWP pairs #1 and #2 having different bandwidths are arranged in a carrier.

The DL/UL BWP pairs #1 and #2 each have a narrower bandwidth than a bandwidth of the carrier. The DL/UL BWP pair #1 has the narrower bandwidth than that of the DL/UL BWP #2. Furthermore, a UL BWP and a DL BWP have the same bandwidth in the DL/UL BWP pair #1. Similarly, a UL BWP and a DL BWP have the same bandwidth in the DL/UL BWP pair #2, too.

Furthermore, the DL/UL BWP pairs #1 and #2 may be arranged such that a frequency band of the DL/UL BWP #2 includes a frequency band of the DL/UL BWP pair #1.

Furthermore, as illustrated in FIG. 5, the DL/UL BWP pairs #1 and #2 are each arranged unevenly on an upper limit side of the frequency band of the carrier (cell). More specifically, the DL/UL BWP pairs #1 and #2 are each arranged by being shifted from a center frequency of the carrier to an upper limit frequency of the carrier. In addition, the DL/UL BWP pairs #1 and #2 illustrated in FIG. 5 are arranged so as to include the upper limit frequency of the carrier (the DL/UL BWP pairs #1 and #2 are arranged by being aligned with the upper limit frequency of the carrier or edges of the frequency bands of the DL/UL BWP pairs match with an edge of the frequency band of the carrier). However, the DL/UL BWP pairs #1 and #2 may be arranged with, for example, a given bandwidth from the upper limit frequency without including the upper limit frequency.

That the DL/UL BWP pairs are arranged unevenly on the upper limit side includes both of that the DL/UL BWP pairs are arranged so as to include the upper limit of the frequency band of the carrier (the DL/UL BWP pairs #1 and #2 in FIG. 5), and that the DL/UL BWP pairs are arranged without including the upper limit frequency of the carrier.

Furthermore, in the example in FIG. 5, the DL/UL BWP pairs are arranged unevenly on the upper limit side of the frequency band of the carrier, yet may be arranged unevenly on a lower limit side of the frequency band.

<Operation of User Terminal>

Hereinafter, an operation of a user terminal will be described according to the first aspect. The user terminal may switch between the DL/UL BWP pairs #1 and #2 configured as illustrated in FIG. 5, and perform radio communication.

In this regard, when the DL/UL BWP pairs #1 and #2 are configured unevenly at one edge (the upper limit frequency or the lower limit frequency) of the frequency band of the carrier, the user terminal needs to perform RF retuning to switch between the DL/UL BWP pairs. FIG. 5 illustrates a case where the DL/UL BWP pair #1 is switched to the DL/UL BWP pair #2.

As illustrated in FIG. 5, the user terminal switches the DL/UL BWP pair #1 to the DL/UL BWP pair #2 according to Downlink Control Information (DCI) of the DL/UL BWP pair #1. In this case, the user terminal performs RF retuning.

As described above, according to the first aspect, a DL/UL BWP pair (e.g., the DL/UL BWP pair #1 in FIG. 5) having a narrow bandwidth is arranged near the center frequency of the carrier. Consequently, it is possible to prevent or suppress to some degree a restriction on contiguous uplink resource allocation in another user terminal compared to the configuration in FIG. 4 where PUCCH resources are arranged near the center frequency of the carrier.

More specifically, one of periodic PUCCH resources arranged at both edges of a bandwidth of a UL BWP by frequency hopping is arranged by being aligned with one edge of the frequency band of the carrier. Consequently, it is possible to minimize the restriction on the contiguous uplink resource allocation in the another user terminal. On the other hand, there is a probability that the other periodic PUCCH resources arranged by being aligned with the other edge of the UL BWP divides the uplink resources of the another user terminal. However, it is possible to suppress the restriction on the contiguous uplink resource allocation (reserve contiguous uplink resources long) compared to a case where the other periodic PUCCH resources are arranged near the center frequency of the carrier.

As described above, according to the first aspect, it is necessary to perform RF returning when the DL/UL BWP pairs are switched. As described above, it is not possible to perform radio communication in an RF retuning gap. However, taking into account a frequency of the above switching, and that the RF retuning gap of the RF retuning is 50 to 200 μs is (corresponding to approximately 3 symbols of legacy LTE), it is possible to appropriately perform radio communication that uses TDD by suppressing the restriction on the contiguous uplink resource allocation in the above another user terminal. Consequently, it is possible to improve a throughput of a radio communication system.

(Second Aspect)

Next, the second aspect will be described with reference to FIG. 6. Similar to the above first aspect, according to the second aspect, edges of bandwidths of DL/UL BWP pairs #1 and #2 are each arranged unevenly at one edge of a bandwidth of a carrier.

The DL/UL BWP pairs #1 and #2 each have a narrower bandwidth than a bandwidth of the carrier. The DL/UL BWP pair #1 has the narrower bandwidth than a DL BWP of the DL/UL BWP #2. Furthermore, a UL BWP and a DL BWP have the same bandwidth in the DL/UL BWP pair #1. In other words, a center frequency of the UL BWP and a center frequency of a DL BWP may be the same.

Figure 6:
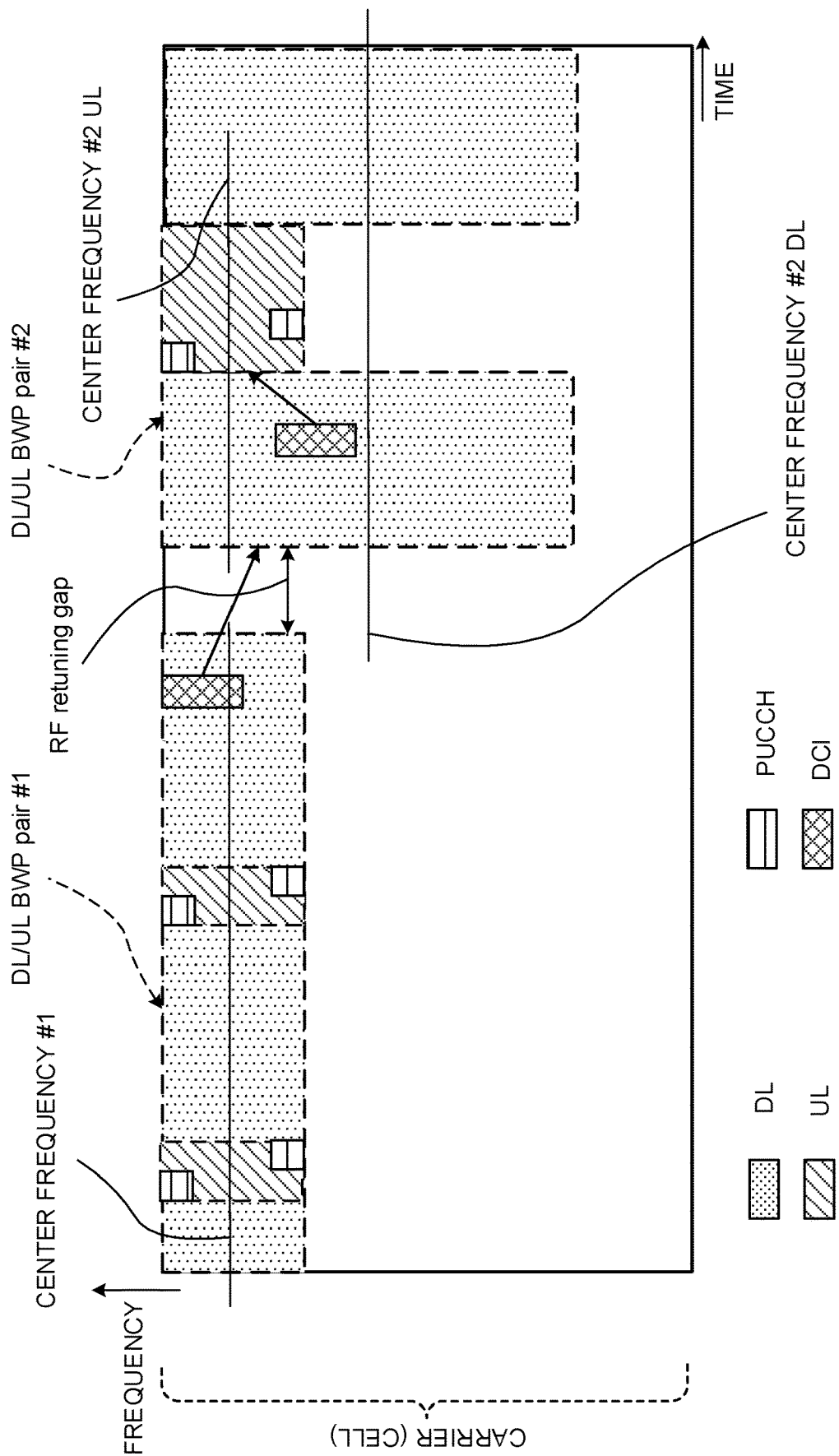
FIG. 6 is a diagram for explaining radio communication by TDD that uses a DL/UL BWP pair according to a second aspect.

On the other hand, a UL BWP and a DL BWP have different bandwidths in the DL/UL BWP pair #2 as illustrated in FIG. 6. The DL BWP has a bandwidth that is narrower than the bandwidth of the carrier, yet is wider than the bandwidth of the DL/UL BWP pair #1. The UL BWP has the same bandwidth as the bandwidth of the DL/UL BWP pair #1.

In the DL/UL BWP pair #2, a center frequency of the UL BWP and a center frequency of the DL BWP do not need to be matched. In the example illustrated in FIG. 6, the center frequency of the UL BWP of the DL/UL BWP pair #2 and the center frequency of the DL/UL BWP pair #1 (the center frequencies of the DL BWP and the UL BWP) match.

<Operation of User Terminal>

Hereinafter, an operation of a user terminal according to the second aspect will be described. The user terminal may switch between the DL/UL BWP pairs #1 and #2 configured as illustrated in FIG. 6, and perform radio communication.

According to the second aspect, when a DL BWP and a UL BWP are configured differently similar to the DL/UL BWP pair #2, a narrower band may be configured so as to be included in a wider band. According to this configuration, it is possible to avoid an occurrence of RF returning when the DL BWP and the UL BWP are switched during TDD.

When performing communication that uses a DL/UL BWP pair (e.g., the DL/UL BWP pair #2 in FIG. 6) having a DL BWP and a UL BWP whose center frequencies do not match, the user terminal may not transmit and/or receive a Physical Resource Block (PRB) beyond a wider band (the band of the DL BWP of the DL/UL BWP pair #2 in FIG. 6) of the DL BWP or the UL BWP.

Furthermore, when performing radio communication that uses a DL/UL BWP pair (e.g., the DL/UL BWP pair #1 in FIG. 6) having a DL BWP and a UL BWP whose center frequencies match, the user terminal may not transmit and/or receive a Physical Resource Block (PRB) beyond the above wider band (the band of the DL BWP of the DL/UL BWP pair #2 in FIG. 6). In addition, the bandwidth of the DL BWP is configured wider than that of the UL BWP in the DL/UL BWP pair #2 in FIG. 6. However, the UL BWP may be configured wider than the DL BWP.

When performing communication that uses the DL/UL BWP pair (e.g., the DL/UL BWP pair #2 in FIG. 6) having the DL BWP and the UL BWP whose center frequencies do not match, the user terminal may specify a resource allocation domain based on a wider band of the DL BWP or the UL BWP, and make a DCI size common between uplink and downlink. By making the DCI size common between uplink and downlink, it is possible to reduce the number of times of blind decoding.

Furthermore, the specified DCI may be commonly used between a plurality of different DL/UL BWP pairs. For example, a resource allocation domain may be specified based on a wider band of the DL BWP or the UL BWP of the DL/UL BWP pair #2, and this DCI may be used for the DL/UL BWP pair #1.

As described above, according to the second aspect, the DL/UL BWP pair (e.g., the DL/UL BWP pair #1 in FIG. 6) having the narrower bandwidth is not arranged near the center frequency of the carrier. Consequently, PUCCH resources are arranged near the center frequency of the carrier, so that it is possible to prevent or suppress to some degree a restriction on contiguous uplink resource allocation in another user terminal.

Furthermore, in the DL/UL BWP pair (e.g., the DL/UL BWP pair #2 in FIG. 6) including the DL BWP having the wider bandwidth than that of the other DL/UL BWP pair, the UL BWP is configured to the same bandwidth as that of the DL/UL BWP pair having the narrower bandwidth. Consequently, it is possible to minimize the restriction on the contiguous uplink resource allocation in the another user terminal.

For example, there is a high probability that periodic PUCCH resources near the center frequency of the carrier among the periodic PUCCH resources included in the UL BWP of the DL/UL BWP pair #2 in FIG. 5 divide contiguous uplink resources in the another user terminal, and it is difficult to contiguously reserve the resources long after the division in some cases. On the other hand, according to the second aspect, the periodic PUCCH resources near the center frequency of the above carrier can be arranged closer to the edge of the carrier band. Consequently, even when the contiguous uplink resources are divided in the another user terminal, it is possible to contiguously reserve resources after the division long.

In view of the above, it is possible to appropriately perform radio communication that uses TDD during radio communication that uses DL/UL BWP pairs.

(Third Aspect)

Next, the third aspect will be described with reference to FIG. 7. According to the third aspect, periodic PUCCH resources are reserved in a UL BWP of a DL/UL BWP pair #1, and aperiodic PUCCH resources are reserved in a UL BWP of a DL/UL BWP pair #2. Points other than how to transmit uplink control information in a UL BWP of a DL/UL BWP pair are similar to those of the above-described first aspect, and therefore description thereof will be omitted.

<Operation of User Terminal>

Figure 7:
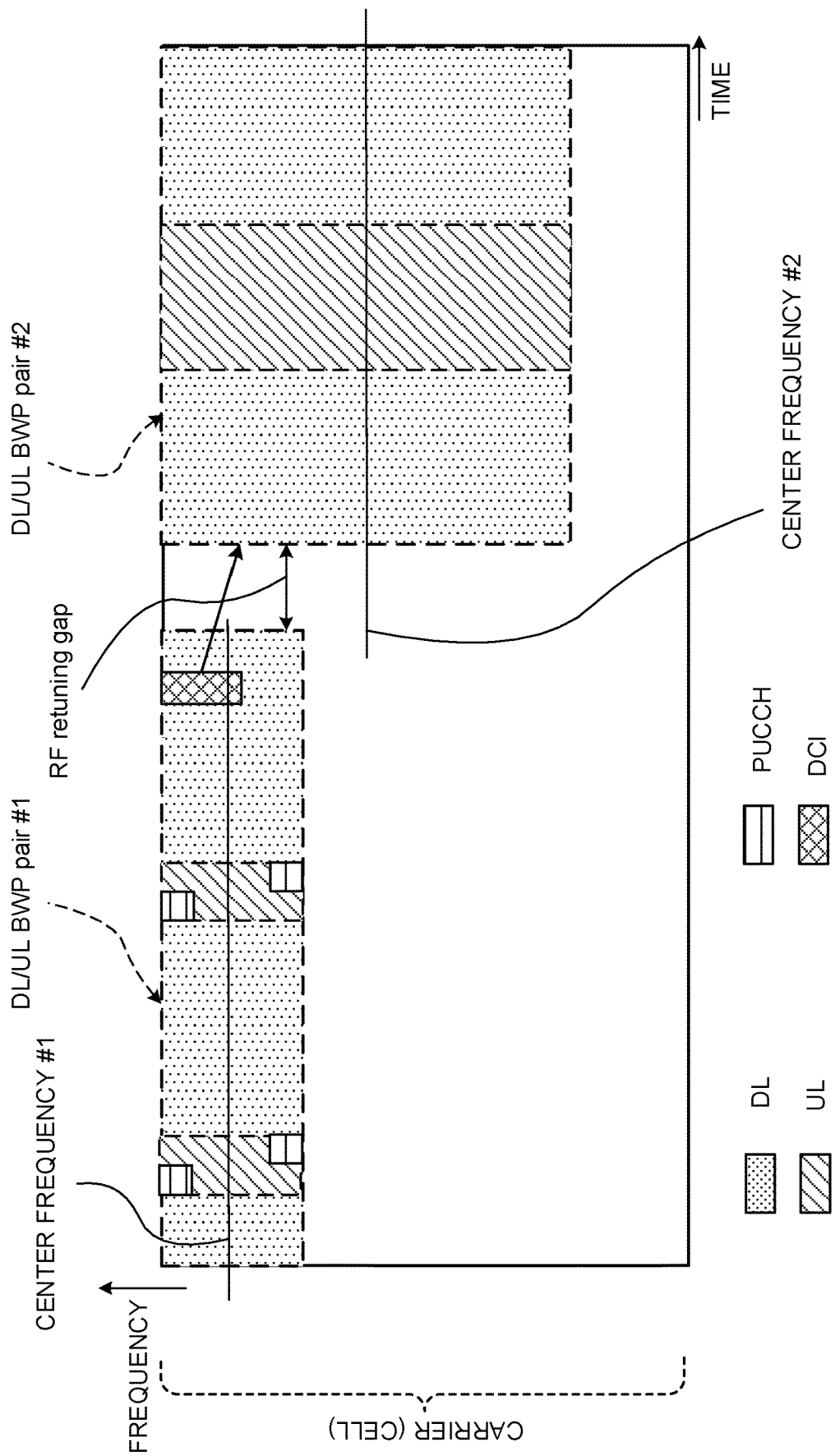
FIG. 7 is a diagram for explaining radio communication by TDD that uses a DL/UL BWP pair according to a third aspect.

A user terminal may switch between the DL/UL BWP pairs #1 and #2 configured as illustrated in FIG. 7, and perform radio communication. Resources for a periodic PUCCH are not reserved in the UL BWP of the DL/UL BWP pair #2. Hence, unless aperiodic PUCCH resources are allocated, division of uplink resources (a restriction on contiguous uplink resource allocation) does not occur in another user terminal.

When notifying a network side of ACK/NACK and CSI, the user terminal may use aperiodic PUCCH resources. In this regard, according to the third aspect, a UL BWP for which resources for transmitting a periodic PUCCH are not reserved is configured. However, the UL BWP is not limited to the periodic PUCCH. A UL BWP for which PUCCH resources are not reserved may be configured.

As described above, according to the third aspect, a DL/UL BWP pair (e.g., the DL/UL BWP pair #1 in FIG. 7) having a narrower bandwidth is not arranged near a center frequency of a carrier. Consequently, PUCCH resources are arranged near the center frequency of the carrier, so that it is possible to prevent a restriction on contiguous uplink resource allocation in another user terminal.

Furthermore, in a DL BWP pair (e.g., the DL/UL BWP pair #2 in FIG. 7) including a DL BWP having a wider bandwidth than that of the other DL/UL BWP pair, resources for a periodic PUCCH are not reserved in a UL BWP. Consequently, unless aperiodic PUCCH resources are allocated, uplink resources are not divided in the another user terminal.

(Fourth Aspect)

Next, the fourth aspect will be described with reference to FIG. 8. According to the fourth aspect, periodic PUCCH resources reserved in a UL BWP of a DL/UL BWP pair #2 are configured to be associated with positions of periodic PUCCH resources of a DL/UL BWP pair #1. Points other than the positions of the periodic PUCCH resources of the UL BWP of the DL/UL BWP pair #2 are the same as those in the above-described first aspect, and therefore description thereof will be omitted.

<Operation of User Terminal>

Figure 8:
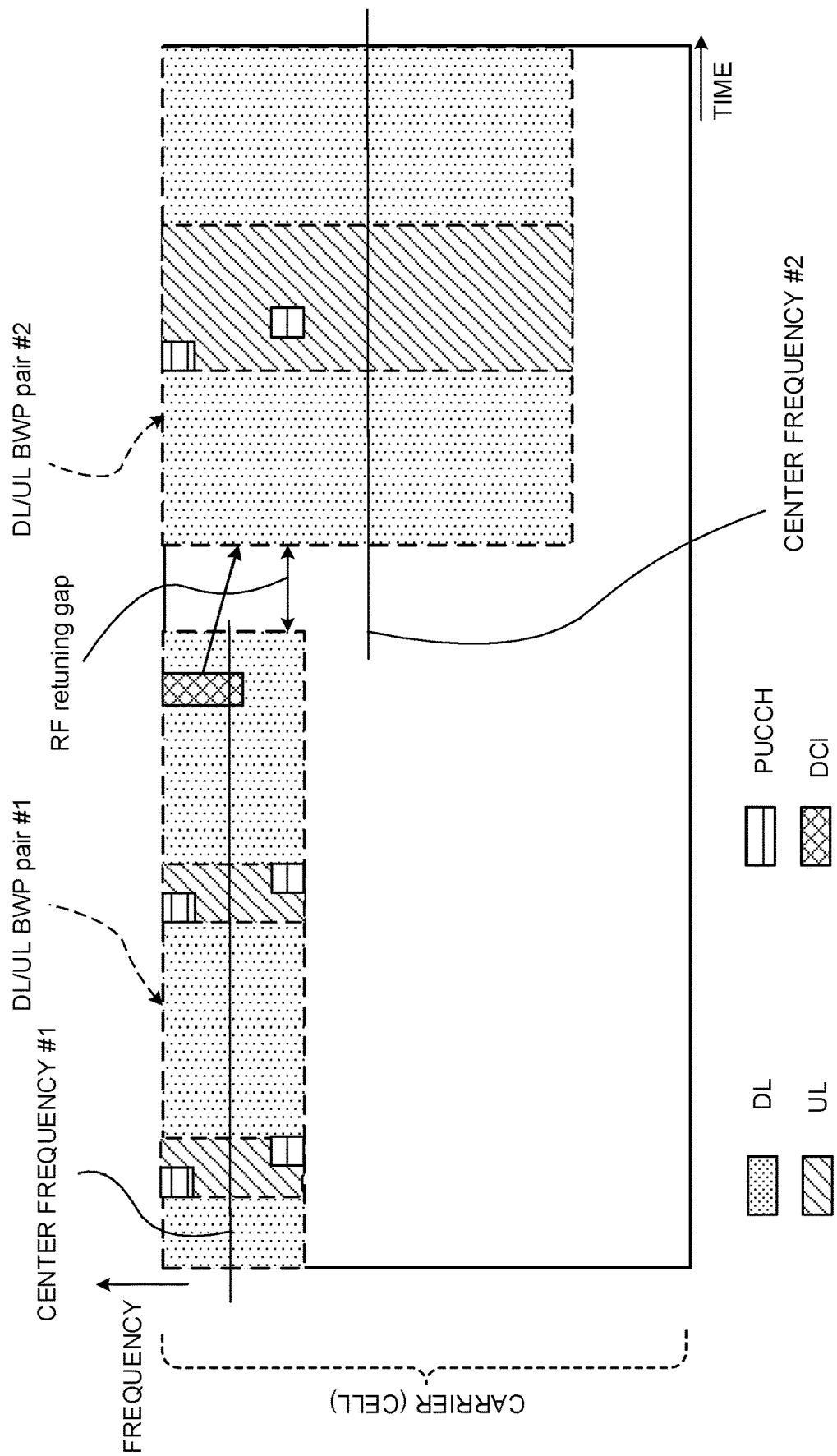
FIG. 8 is a diagram for explaining radio communication by TDD that uses a DL/UL BWP pair according to a fourth aspect.

A user terminal may switch between the DL/UL BWP pairs #1 and #2 configured as illustrated in FIG. 8, and perform radio communication. In this regard, a PUCCH in the UL BWP of the DL/UL BWP pair #2 is arranged in the same frequency domain as that of PUCCH resources arranged in the UL BWP of the DL/UL BWP pair #1. Consequently, it is possible to prevent the PUCCH resources from being reserved around a center frequency of a carrier.

When transmitting a PUCCH in the UL BWP of the DL/UL BWP pair #2, the user terminal can transmit the PUCCH by using resources near an edge of a carrier band. Consequently, even when the contiguous uplink resources are divided in the another user terminal, it is possible to contiguously reserve resources after the division long.

These periodic PUCCH resources may be configured in a common frequency band in different DL/UL BWP pairs (UL BWPs), and may be made common. For example, a configuration of the common PUCCH resources may be configured to the user terminal differently from a configuration of the DL/UL BWP pair.

As described above, according to the fourth aspect, in not only a DL/UL BWP pair (e.g., the DL/UL BWP pair #1 in FIG. 8) having a narrower bandwidth, but also a DL/UL BWP pair (e.g., the DL/UL BWP pair #2 in FIG. 8) configured over a large part of the carrier bandwidth, the PUCCH resources are not arranged near the center frequency of the carrier. Consequently, the PUCCH resources are arranged near the center frequency of the carrier, so that it is possible to prevent a restriction on contiguous uplink resource allocation in another user terminal.

In addition, a bandwidth of a UL BWP of the DL/UL BWP #2 illustrated in FIG. 8 is the same as a bandwidth of a DL BWP of the DL/UL BWP #2, yet is not limited to this. A band of the UL BWP of the DL/UL BWP pair #2 only needs to include a frequency band (frequency resources) reserved for a PUCCH in the UL BWP of the DL/UL BWP pair #1.

Hereinafter, that the UL BWP and the DL BWP have different bandwidths in the DL/UL BWP pair #2 in the above second aspect will be focused upon. For example, it is considered to obtain a frequency diversity effect by maximizing the band of the UL BWP (the bandwidth of the carrier).

Figure 9:
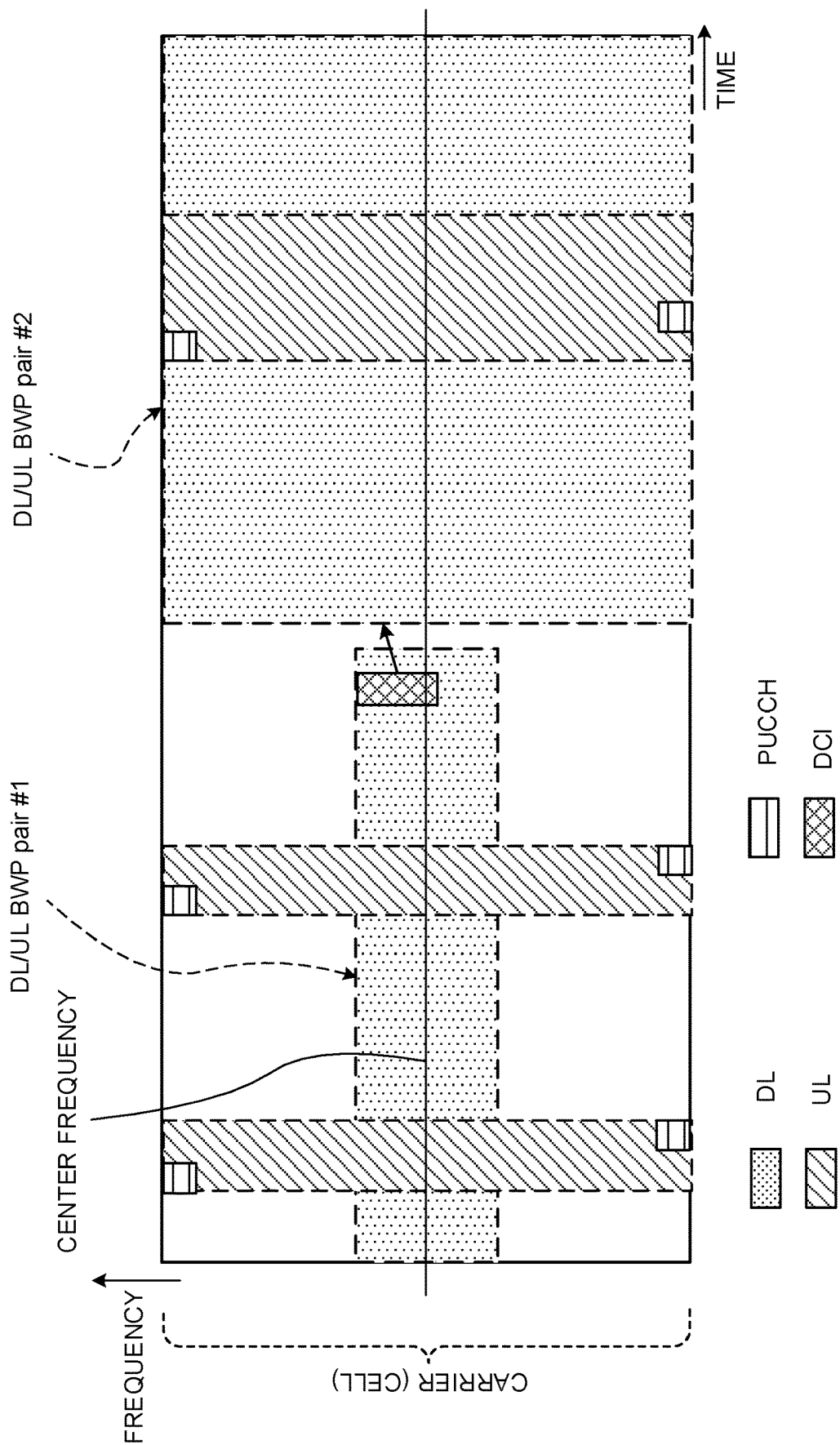
FIG. 9 is a diagram for explaining radio communication by TDD that uses a DL/UL BWP pair.

On the other hand, taking into account suppression of a load such as RF retuning on the user terminal side when DL/UL are switched, it is preferable to match center frequencies of the UL BWP and the DL BWP. Thus, a configuration illustrated in FIG. 9 is considered in a case where different bandwidths and the center frequencies are commonalized in the UL BWP and the DL BWP. In this regard, in a case of the configuration in FIG. 9, a DL/UL BWP pair needs to be configured around the center frequency of the carrier at all times. Therefore, PUCCH resources concentrate around the center frequency.

(Modified Example)

Hence, a configuration to prevent a DL/UL BWP pair from being configured around a center frequency of a carrier as much as possible focusing a center frequency of the DL/UL BWP pair, and minimize a gap made by RF retuning will be described.

Figure 10:
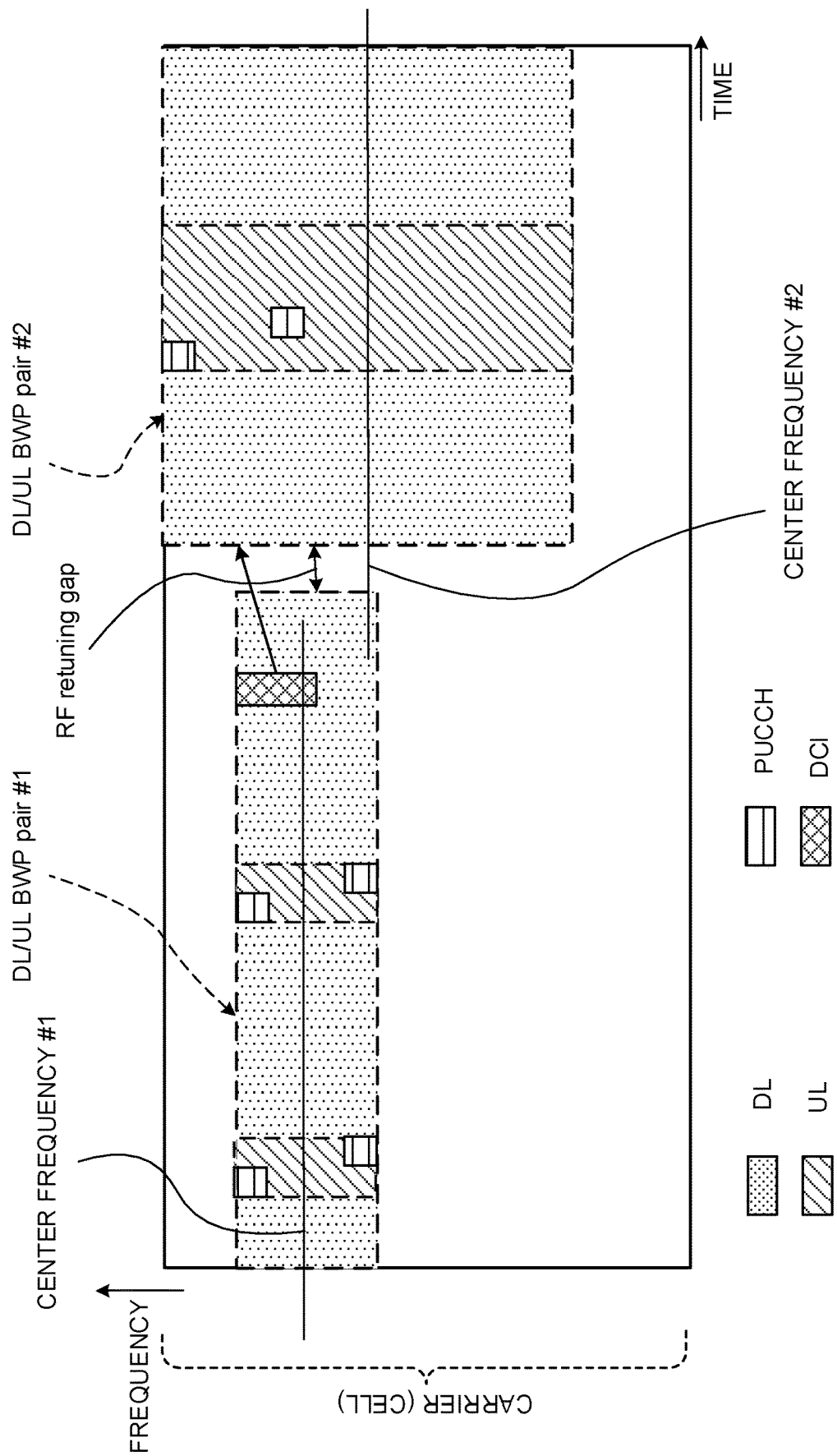
FIG. 10 is a diagram for explaining a modified example of radio communication by TDD that uses a DL/UL BWP pair.

In FIG. 10, two DL/UL BWP pairs are configured such that respective center frequencies are included in a band of the other pair. Consequently, it is possible to suppress a gap made by RF retuning, and prevent resources from concentrating on the center frequency of the carrier.

In addition, a relationship between the above-described DL/UL BWP pairs may be applied to a relationship between a DL BWP and a UL BWP of one DL/UL BWP pair. That is, the center frequency of the DL BWP is configured so as to be included in the frequency band of the UL BWP, and the center frequency of the UL BWP is included in the frequency band of the DL BWP in the DL/UL BWP pair. Consequently, when UL/DL are switched, it is possible to suppress a gap made by RF retuning.

(Radio Communication System)

The configuration of the radio communication system according to the present embodiment will be described below. This radio communication system is applied the radio communication method according to each of the above aspects. In addition, the radio communication method according to each of the above aspects may be each applied alone or may be applied in combination.

Figure 11:
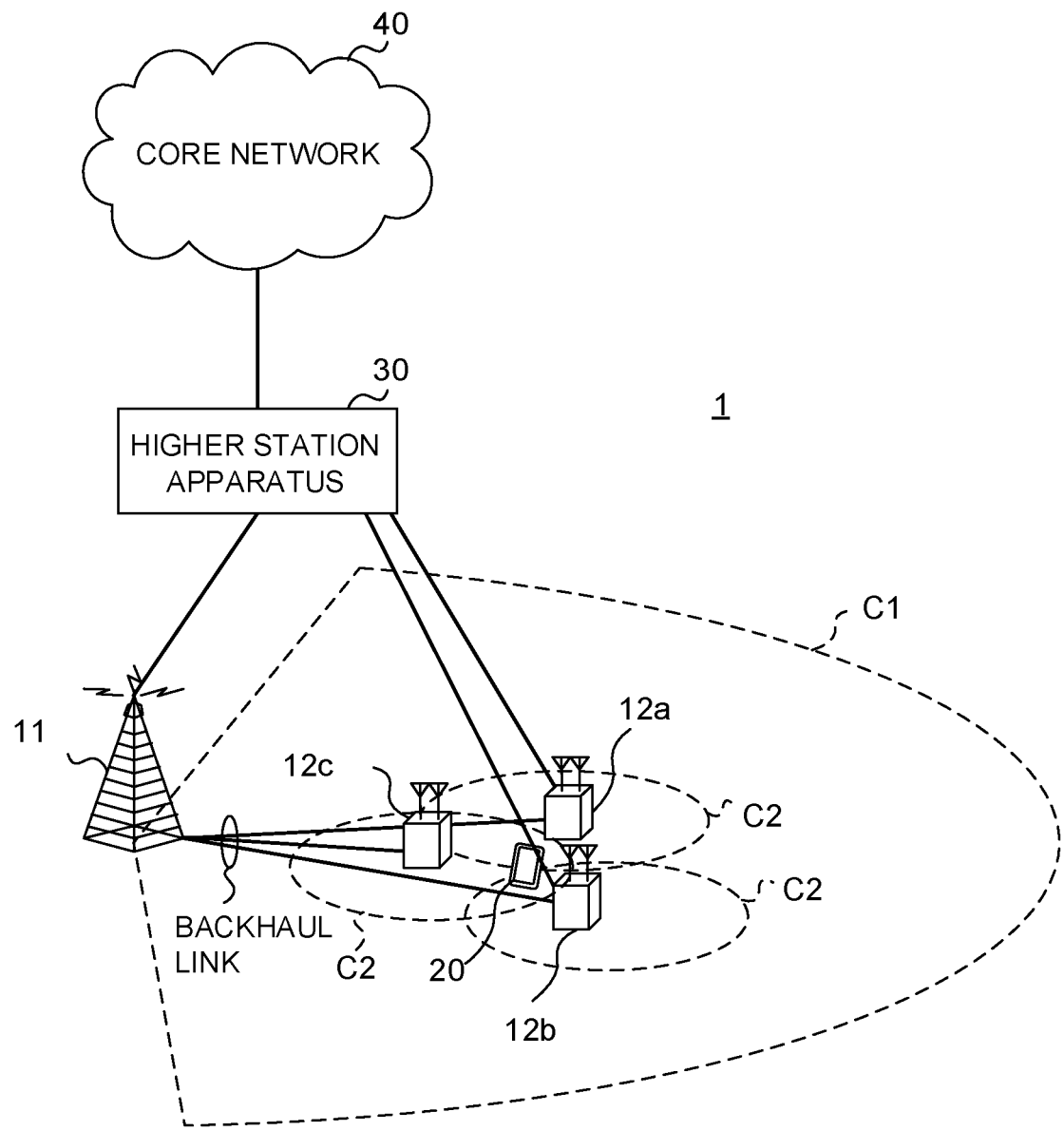
FIG. 11 is a diagram illustrating one example of a schematic configuration of a radio communication system according to the present embodiment.

FIG. 11 is a diagram illustrating one example of a schematic configuration of the radio communication system according to the present embodiment. A radio communication system 1 can apply Carrier Aggregation (CA) and/or Dual Connectivity (DC) that aggregate a plurality of base frequency blocks (component carriers) whose 1 unit is a system bandwidth (e.g., 20 MHz) of the LTE system. In this regard, the radio communication system 1 may be referred to as SUPER 3G, LTE-Advanced (LTE-A), IMT-Advanced, 4G, 5G, Future Radio Access (FRA) or New RAT (NR).

The radio communication system 1 illustrated in FIG. 11 includes a radio base station 11 that forms a macro cell C1, and radio base stations 12a to 12c that are located in the macro cell C1 and form small cells C2 narrower than the macro cell C1. Furthermore, a user terminal 20 is located in the macro cell C1 and each small cell C2. Different numerologies may be configured to be applied between cells. In addition, the numerology may be at least one of a subcarrier-spacing, a symbol length, a Cyclic Prefix (CP) length, the number of symbols per Transmission Time Interval (TTI) and a time duration of the TTI. Furthermore, the slot may be a time unit based on the numerology applied by the user terminal. The number of symbols per slot may be determined according to a subcarrier-spacing.

The user terminal 20 can connect with both of the radio base station 11 and the radio base stations 12. The user terminal 20 is assumed to concurrently use the macro cell C1 and the small cells C2 that use different frequencies by CA or DC. Furthermore, the user terminal 20 can apply CA or DC by using a plurality of cells (CCs) (e.g., two CCs or more). Furthermore, the user terminal can use licensed band CCs and unlicensed band CCs as a plurality of cells.

Furthermore, the user terminal 20 can perform communication by using Time Division Duplex (TDD) and/or Frequency Division Duplex (FDD) in each cell (carrier). A TDD cell and an FDD cell may be referred to as a TDD carrier (frame configuration second type) and an FDD carrier (frame configuration first type), respectively.

Furthermore, in each cell (carrier), a slot (also referred to as, for example, a TTI, a general TTI, a long TTI, a general subframe, a long subframe or a subframe) having a relatively long time duration (e.g., 1 ms) or a slot (also referred to as, for example, a mini slot, a short TTI or a short subframe) having a relatively short time duration may be applied. Furthermore, a slot of 2 or more time durations may be applied in each cell.

The user terminal 20 and the radio base station 11 can communicate by using a carrier (referred to as a Legacy carrier) of a narrow bandwidth in a relatively low frequency band (e.g., 2 GHz). On the other hand, the user terminal 20 and each radio base station 12 may use a carrier of a wide bandwidth in a relatively high frequency band (e.g., 3.5 GHz, 5 GHz or 30 to 70 GHz) or may use the same carrier as that used between the user terminal 20 and the radio base station 11. In this regard, a configuration of the frequency band used by each radio base station is not limited to this. Furthermore, one or more BWPs may be configured to the user terminal 20. The BWP is composed of at least part of a carrier.

The radio base station 11 and each radio base station 12 (or the two radio base stations 12) can be configured to be connected by way of wired connection (e.g., optical fibers compliant with a Common Public Radio Interface (CPRI) or an X2 interface) or radio connection.

The radio base station 11 and each radio base station 12 are each connected with a higher station apparatus 30 and connected with a core network 40 via the higher station apparatus 30. In this regard, the higher station apparatus 30 includes, for example, an access gateway apparatus, a Radio Network Controller (RNC) and a Mobility Management Entity (MME), yet is not limited to these. Furthermore, each radio base station 12 may be connected with the higher station apparatus 30 via the radio base station 11.

In this regard, the radio base station 11 is a radio base station that has a relatively wide coverage, and may be referred to as a macro base station, an aggregate node, an eNodeB (eNB) or a transmission/reception point. Furthermore, each radio base station 12 is a radio base station that has a local coverage, and may be referred to as a small base station, a micro base station, a pico base station, a femto base station, a Home eNodeB (HeNB), a Remote Radio Head (RRH) or a transmission/reception point. The radio base stations 11 and 12 will be collectively referred to as a radio base station 10 below when not distinguished.

Each user terminal 20 is a terminal that supports various communication schemes such as LTE and LTE-A, and may include not only a mobile communication terminal but also a fixed communication terminal. Furthermore, the user terminal 20 can perform Device-to-Device communication (D2D) with the other user terminal 20.

The radio communication system 1 can apply Orthogonal Frequency-Division Multiple Access (OFDMA) to Downlink (DL) and can apply Single Carrier-Frequency Division Multiple Access (SC-FDMA) to Uplink (UL) as radio access schemes. OFDMA is a multicarrier transmission scheme that divides a frequency band into a plurality of narrow frequency bands (subcarriers) and maps data on each subcarrier to perform communication. SC-FDMA is a single carrier transmission scheme that divides a system bandwidth into bands including one or contiguous resource blocks per terminal and causes a plurality of terminals to use respectively different bands to reduce an inter-terminal interference. In this regard, uplink and downlink radio access schemes are not limited to a combination of these schemes, and OFDMA may be used on UL. Furthermore, SC-FDMA is applicable to Sidelink (SL) used for device-to-device communication.

The radio communication system 1 uses a DL data channel (also referred to as, for example, a PDSCH: Physical Downlink Shared Channel or a DL shared channel) shared by each user terminal 20, a broadcast channel (PBCH: Physical Broadcast Channel) and an L1/L2 control channel as DL channels. DL data (at least one of user data, higher layer control information and a System Information Block (SIB)) is conveyed on the PDSCH. Furthermore, a Master Information Block (MIB) is conveyed on the PBCH.

The L1/L2 control channel includes a DL control channel (a Physical Downlink Control Channel (PDCCH) and/or an Enhanced Physical Downlink Control Channel (EPDCCH)), a Physical Control Format Indicator Channel (PCFICH), and a Physical Hybrid-ARQ Indicator Channel (PHICH). Downlink Control Information (DCI) including scheduling information of the PDSCH and the PUSCH is conveyed on the PDCCH. The number of OFDM symbols used for the PDCCH is conveyed on the PCFICH. The EPDCCH is subjected to frequency division multiplexing with the PDSCH and is used to convey DCI similar to the PDCCH. Transmission acknowledgement information (also referred to as, for example, A/N, HARQ-ACK, an HARQ-ACK bit or an A/N codebook) of the PUSCH can be conveyed on the PHICH.

The radio communication system 1 uses a UL data channel (also referred to as, for example, a PUSCH: Physical Uplink Shared Channel or a UL shared channel) shared by each user terminal 20, a UL control channel (PUCCH: Physical Uplink Control Channel), and a random access channel (PRACH: Physical Random Access Channel) as UL channels. UL data (user data and/or higher layer control information) is conveyed on the PUSCH. Uplink Control Information (UCI) including at least one of transmission acknowledgement information (A/N or HARQ-ACK) and Channel State Information (CSI) of the PDSCH is conveyed on the PUSCH or the PUCCH. A random access preamble for establishing connection with a cell can be conveyed on the PRACH.

<Radio Base Station>

Figure 12:
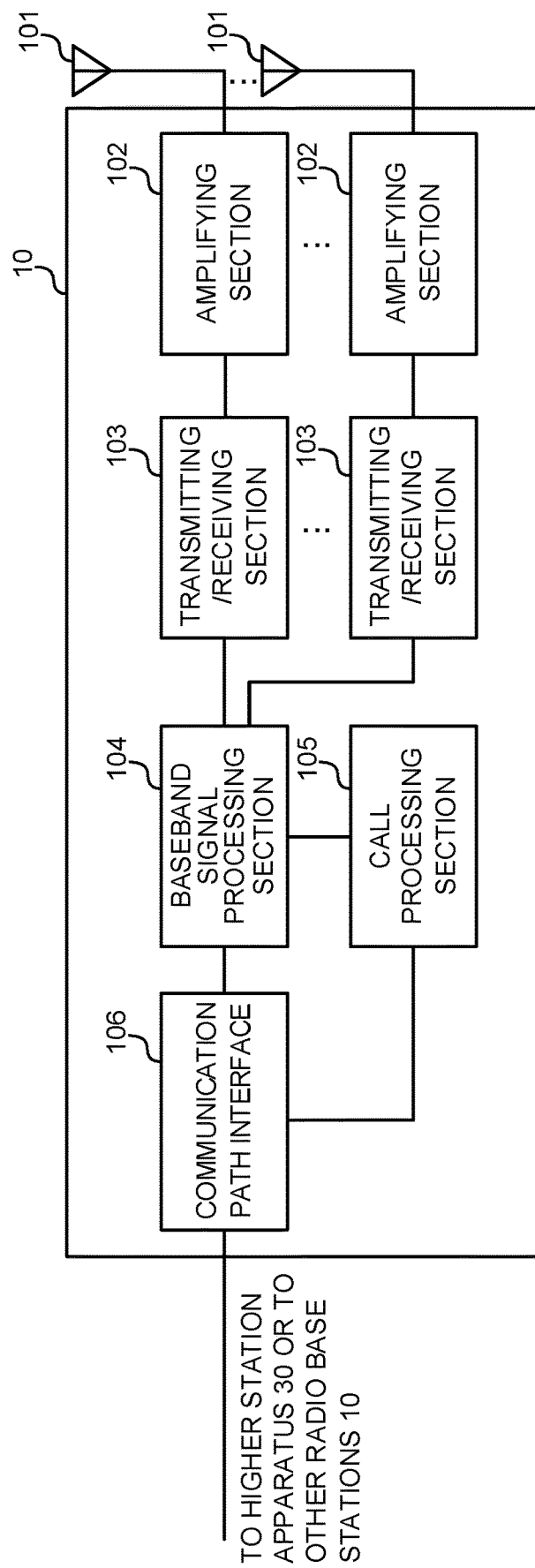
FIG. 12 is a diagram illustrating one example of an overall configuration of a radio base station according to the present embodiment.

FIG. 12 is a diagram illustrating one example of an overall configuration of the radio base station according to the present embodiment. The radio base station 10 includes pluralities of transmission/reception antennas 101, amplifying sections 102 and transmitting/receiving sections 103, a baseband signal processing section 104, a call processing section 105 and a communication path interface 106. In this regard, the radio base station 10 only needs to be configured to include one or more of each of the transmission/reception antennas 101, the amplifying sections 102 and the transmitting/receiving sections 103. The radio base station 10 may compose a "reception apparatus" on UL, and compose a "transmission apparatus" on DL.

User data transmitted from the radio base station 10 to the user terminal 20 on downlink is input from the higher station apparatus 30 to the baseband signal processing section 104 via the communication path interface 106.

The baseband signal processing section 104 performs processing of a Packet Data Convergence Protocol (PDCP) layer, segmentation and concatenation of the user data, transmission processing of a Radio Link Control (RLC) layer such as RLC retransmission control, Medium Access Control (MAC) retransmission control (e.g., Hybrid Automatic Repeat reQuest (HARD) processing), and transmission processing such as at least one of scheduling, transmission format selection, channel coding, rate matching, scrambling, Inverse Fast Fourier Transform (IFFT) processing, and precoding processing on the user data, and transfers the user data to each transmitting/receiving section 103. Furthermore, the baseband signal processing section 104 performs transmission processing such as channel coding and/or inverse fast Fourier transform on a downlink control signal, too, and transfers the downlink control signal to each transmitting/receiving section 103.

Each transmitting/receiving section 103 converts a baseband signal precoded and output per antenna from the baseband signal processing section 104 into a radio frequency range, and transmits a radio frequency signal. The radio frequency signal subjected to frequency conversion by each transmitting/receiving section 103 is amplified by each amplifying section 102, and is transmitted from each transmission/reception antenna 101.

The transmitting/receiving sections 103 can be composed of transmitters/receivers, transmission/reception circuits or transmission/reception apparatuses described based on a common knowledge in a technical field according to the present invention. In this regard, the transmitting/receiving sections 103 may be composed as an integrated transmitting/receiving section or may be composed of transmission sections and reception sections.

Meanwhile, each amplifying section 102 amplifies a radio frequency signal received by each transmission/reception antenna 101 as a UL signal. Each transmitting/receiving section 103 receives the UL signal amplified by each amplifying section 102. Each transmitting/receiving section 103 performs frequency conversion on the received signal into a baseband signal, and outputs the baseband signal to the baseband signal processing section 104.

The baseband signal processing section 104 performs Fast Fourier Transform (FFT) processing, Inverse Discrete Fourier Transform (IDFT) processing, error correcting decoding, MAC retransmission control reception processing, and reception processing of an RLC layer and a PDCP layer on UL data included in the input UL signal, and transfers the UL data to the higher station apparatus 30 via the communication path interface 106. The call processing section 105 performs at least one of call processing such as configuration and release of a communication channel, state management of the radio base station 10 and radio resource management.

The communication path interface 106 transmits and receives signals to and from the higher station apparatus 30 via a given interface. Furthermore, the communication path interface 106 may transmit and receive (backhaul signaling) signals to and from the neighboring radio base station 10 via an inter-base station interface (e.g., optical fibers compliant with the Common Public Radio Interface (CPRI) or the X2 interface).

Furthermore, each transmitting/receiving section 103 transmits a DL signal (e.g., at least one of a DL control signal (also referred to as, for example, a DL control channel or DCI), a DL data signal (also referred to as, for example, a DL data channel or DL data) and a reference signal). Furthermore, each transmitting/receiving section 103 receives a UL signal (e.g., at least one of a UL control signal (also referred to as, for example, a UL control channel or UCI), a UL data signal (also referred to as, for example, a UL data channel or UL data) and a reference signal).

Furthermore, each transmitting/receiving section 103 may transmit higher layer control information (e.g., an MAC CE and/or control information of an RRC signaling).

Furthermore, each transmitting/receiving section 103 may transmit or receive a signal and/or information by Time Division Duplex (TDD) by using DL/UL frequency band pairs (DL/UL BWP pairs) having UL frequency bands and DL frequency bands configured in a frequency direction in a carrier.

Figure 13:
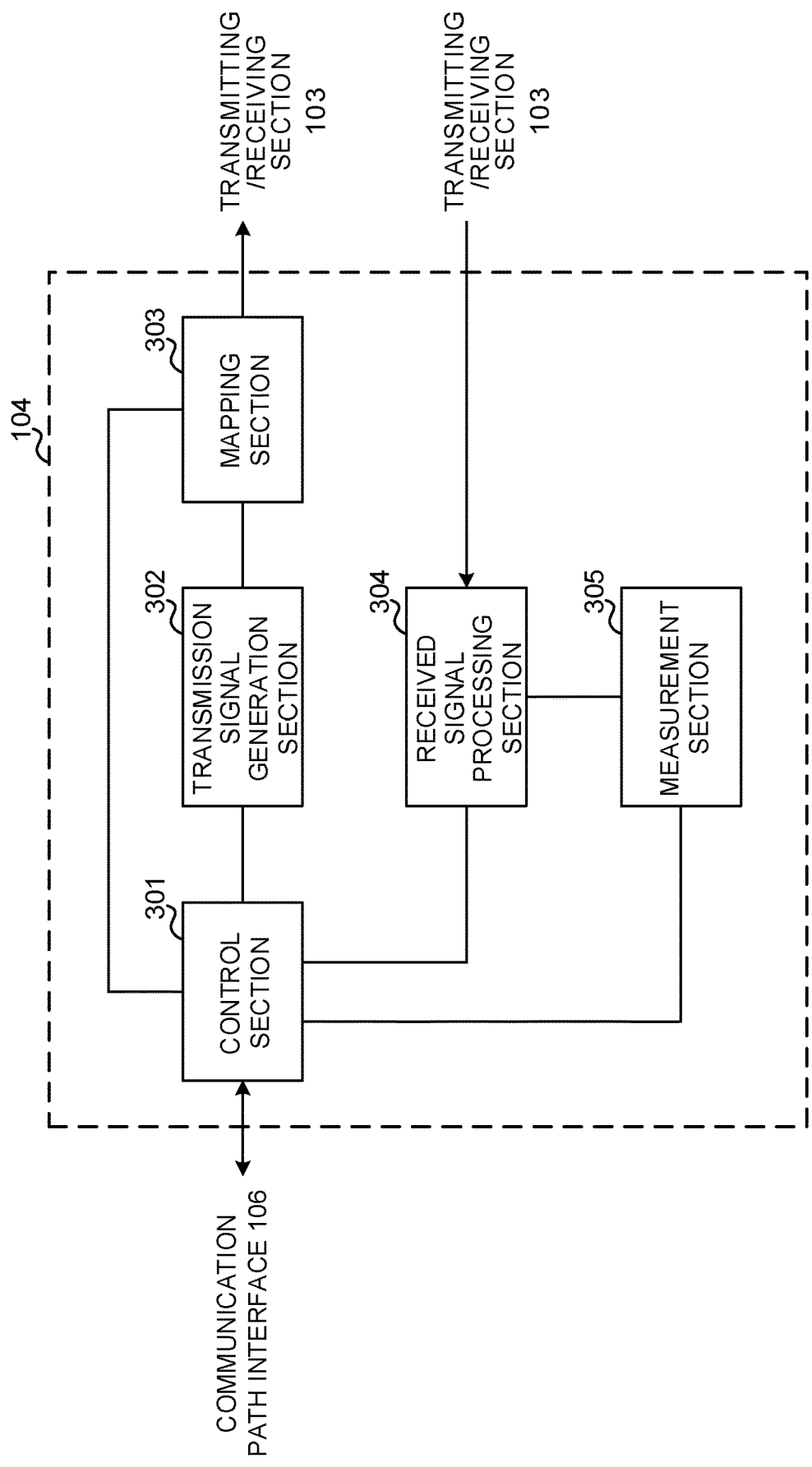
FIG. 13 is a diagram illustrating one example of a function configuration of the radio base station according to the present embodiment.

FIG. 13 is a diagram illustrating one example of a function configuration of the radio base station according to the present embodiment. In addition, FIG. 13 mainly illustrates function blocks of characteristic portions according to the present embodiment, and assumes that the radio base station 10 includes other function blocks, too, that are necessary for radio communication. As illustrated in FIG. 13, the baseband signal processing section 104 includes a control section 301, a transmission signal generating section 302, a mapping section 303, a received signal processing section 304 and a measurement section 305.

The control section 301 controls the entire radio base station 10. The control section 301 controls at least one of, for example, DL signal generation of the transmission signal generating section 302, DL signal mapping of the mapping section 303, UL signal reception processing (e.g., demodulation) of the received signal processing section 304, and measurement of the measurement section 305. Furthermore, the control section 401 may control scheduling of a data channel (including a DL data channel and/or a UL data channel).

The control section 301 may control a transmission direction of each symbol in a time unit (e.g., slot) that is a scheduling unit of the DL data channel. More specifically, the control section 301 may control generation and/or transmission of Slot Format related Information (SFI) indicating DL symbols and/or UL symbols in a slot.

Furthermore, the control section 301 may perform control to configure one or more BWPs, and perform radio communication with the user terminal 20 by Time Division Duplex (TDD) or Frequency Division Duplex (FDD) by using the configured BWPs.

The control section 301 may configure a plurality of DL/UL BWP pairs illustrated in, for example, FIGS. 4 to 10, switch between a plurality of these DL/UL BWP pairs, and perform radio communication with the user terminal 20.

The control section 301 can be composed of a controller, a control circuit or a control apparatus described based on the common knowledge in the technical field according to the present invention.

The transmission signal generating section 302 generates a DL signal (including at least one of DL data (channel), DCI, a DL reference signal and control information of a higher layer signaling) based on an instruction from the control section 301, and outputs the DL signal to the mapping section 303.

The transmission signal generating section 302 can be composed of a signal generator, a signal generating circuit or a signal generating apparatus described based on the common knowledge in the technical field according to the present invention.

The mapping section 303 maps the DL signal generated by the transmission signal generating section 302, on given radio resources based on the instruction from the control section 301, and outputs the DL signal to each transmitting/receiving section 103. For example, the mapping section 303 maps the reference signal on the given radio resource by using an arrangement pattern determined by the control section 301.

The mapping section 303 can be composed of a mapper, a mapping circuit or a mapping apparatus described based on the common knowledge in the technical field according to the present invention.

The received signal processing section 304 performs reception processing (e.g., at least one of demapping, demodulation and decoding) on the UL signal transmitted from the user terminal 20. More specifically, the received signal processing section 304 outputs the received signal and/or the signal after the reception processing to the measurement section 305.

The received signal processing section 304 can be composed of a signal processor, a signal processing circuit or a signal processing apparatus described based on the common knowledge in the technical field according to the present invention. Furthermore, the received signal processing section 404 can compose the reception section according to the present invention.

The measurement section 305 may measure UL channel quality based on, for example, received power (e.g., Reference Signal Received Power (RSRP)) and/or received quality (e.g., Reference Signal Received Quality (RSRQ)) of the reference signal. The measurement section 305 may output a measurement result to the control section 301.

<User Terminal>

Figure 14:
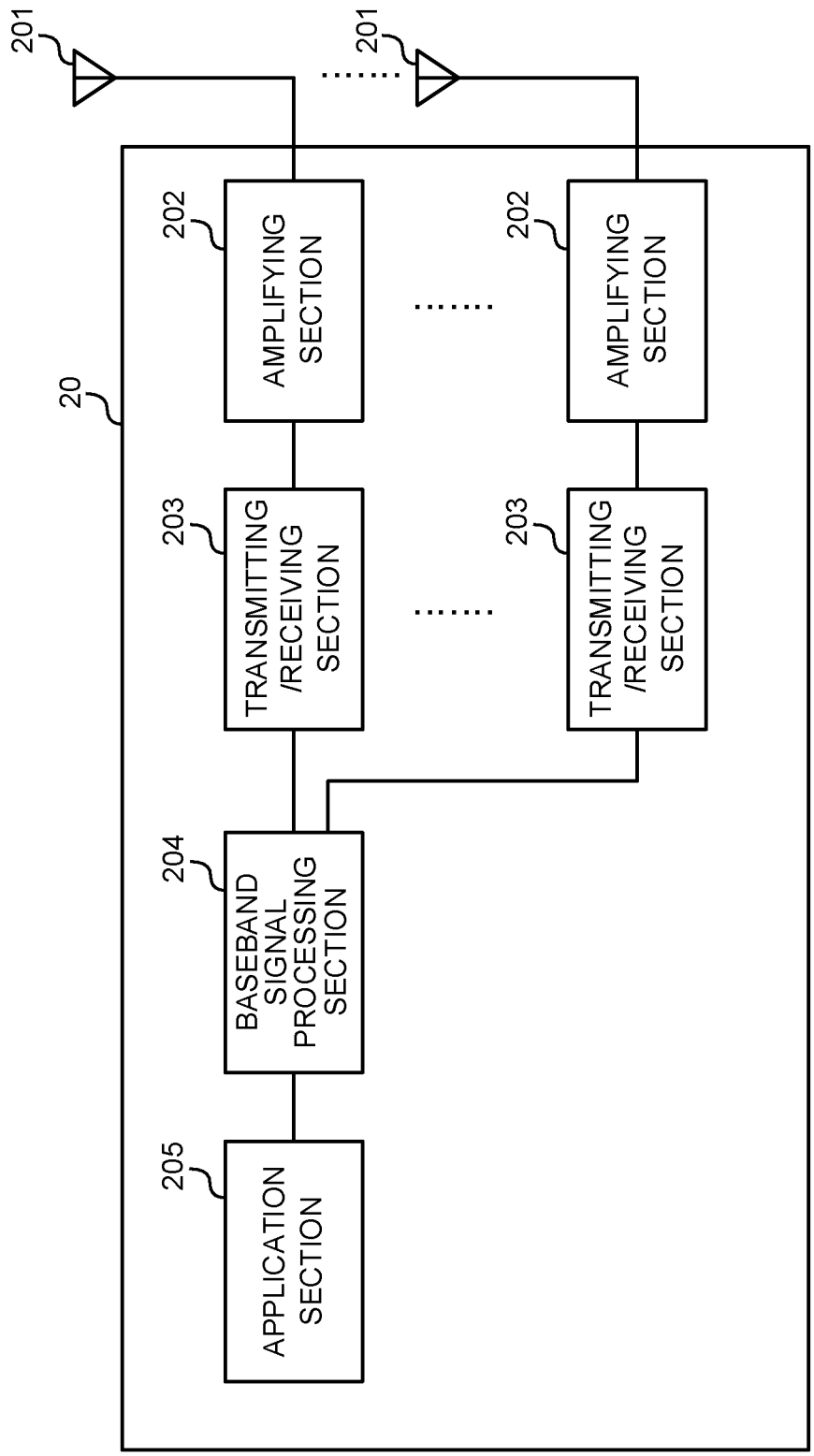
FIG. 14 is a diagram illustrating one example of an overall configuration of a user terminal according to the present embodiment.

FIG. 14 is a diagram illustrating one example of an overall configuration of the user terminal according to the present embodiment. The user terminal 20 includes pluralities of transmission/reception antennas 201 for MIMO transmission, amplifying sections 202 and transmitting/receiving sections 203, a baseband signal processing section 204 and an application section 205. The user terminal 20 may compose a "transmission apparatus" on UL, and compose a "reception apparatus" on DL.

The respective amplifying sections 202 amplify radio frequency signals received at a plurality of transmission/reception antenna 201. Each transmitting/receiving section 203 receives a DL signal amplified by each amplifying section 202. Each transmitting/receiving section 203 performs frequency conversion on the received signal into a baseband signal, and outputs the baseband signal to the baseband signal processing section 204.

The baseband signal processing section 204 performs at least one of FFT processing, error correcting decoding and retransmission control reception processing on the input baseband signal. The baseband signal processing section 204 transfers DL data to the application section 205. The application section 205 performs processing related to layers higher than a physical layer and an MAC layer.

On the other hand, the application section 205 inputs UL data to the baseband signal processing section 204. The baseband signal processing section 204 performs at least one of retransmission control processing (e.g., HARQ processing), channel coding, rate matching, puncturing, Discrete Fourier Transform (DFT) processing and IFFT processing on the UL data, and transfers the UL data to each transmitting/receiving section 203. The baseband signal processing section 204 performs at least one of channel coding, rate matching, puncturing, DFT processing and IFFT processing on the UCI (e.g., at least one of A/N of the DL signal, Channel State information (CSI) and a Scheduling Request (SR)), too, and transfers the UCI to each transmitting/receiving section 203.

Each transmitting/receiving section 203 converts the baseband signal output from the baseband signal processing section 204 into a radio frequency range, and transmits a radio frequency signal. The radio frequency signal subjected to the frequency conversion by each transmitting/receiving section 203 is amplified by each amplifying section 202, and is transmitted from each transmission/reception antenna 201.

Furthermore, each transmitting/receiving section 203 receives a DL signal (e.g., at least one of a DL control signal (also referred to as, for example, a DL control channel or DCI), a DL data signal (also referred to as, for example, a DL data channel or DL data) and a reference signal). Furthermore, each transmitting/receiving section 203 transmits a UL signal (e.g., at least one of a UL control signal (also referred to as, for example, a UL control channel or UCI), a UL data signal (also referred to as, for example, a UL data channel or UL data) and a reference signal).

Furthermore, each transmitting/receiving section 203 may receive higher layer control information (e.g., an MAC CE and/or control information of an RRC signaling).

Furthermore, each transmitting/receiving section 203 may transmit or receive a signal and/or information by Time Division Duplex (TDD) by using DL/UL frequency band pairs (DL/UL BWP pairs) having UL frequency bands and DL frequency bands configured in the frequency direction in a carrier.

The transmitting/receiving sections 203 can be composed as transmitters/receivers, transmission/reception circuits or transmission/reception apparatuses described based on the common knowledge in the technical field according to the present invention. Furthermore, the transmitting/receiving sections 203 may be composed as an integrated transmitting/receiving section or may be composed of transmission sections and reception sections.

Figure 15:
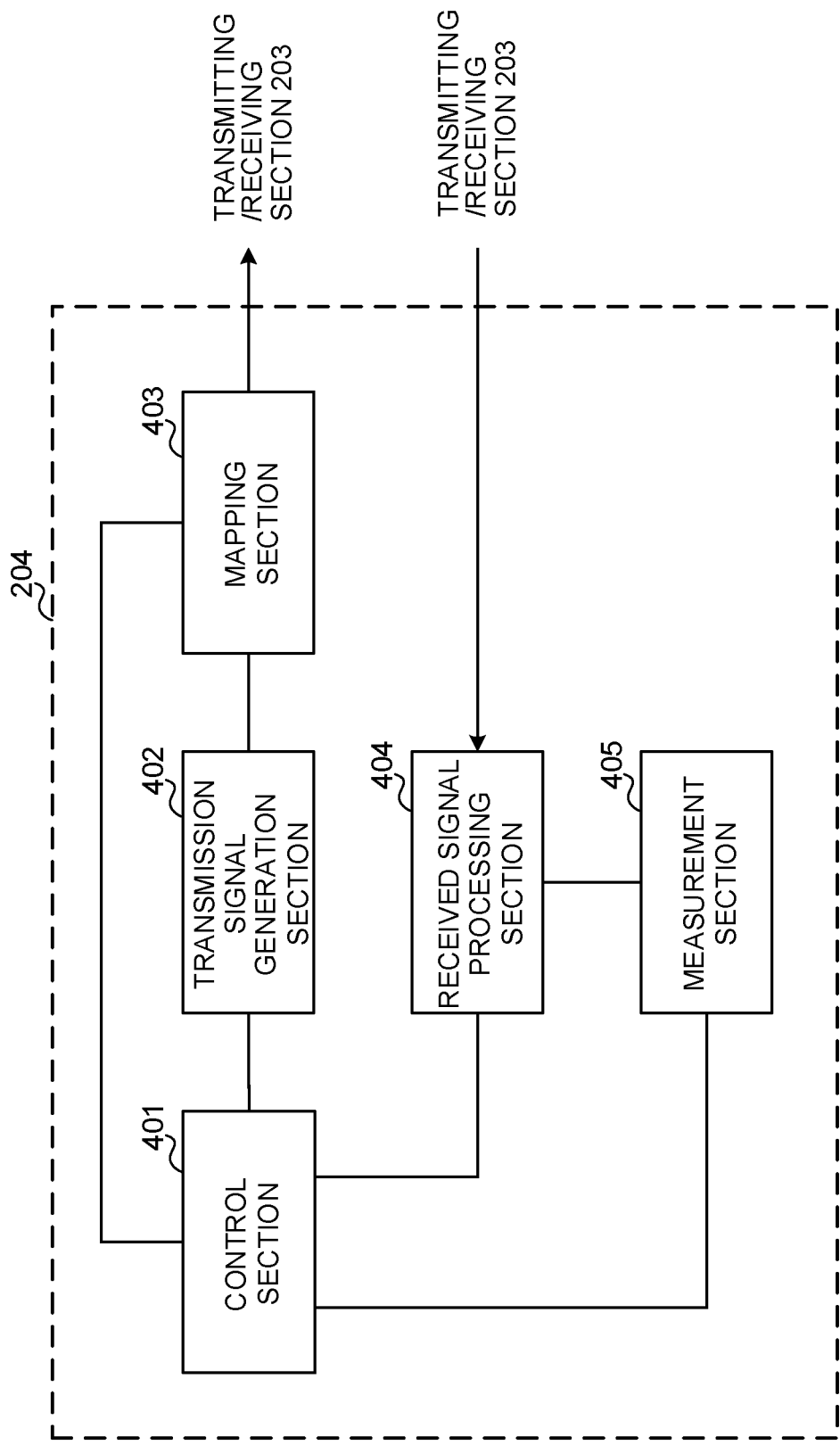
FIG. 15 is a diagram illustrating one example of a function configuration of the user terminal according to the present embodiment.

FIG. 15 is a diagram illustrating one example of a function configuration of the user terminal according to the present embodiment. In addition, FIG. 15 mainly illustrates function blocks of characteristic portions according to the present embodiment, and assumes that the user terminal 20 includes other function blocks, too, that are necessary for radio communication. As illustrated in FIG. 15, the baseband signal processing section 204 of the user terminal 20 includes a control section 401, a transmission signal generating section 402, a mapping section 403, a received signal processing section 404 and a measurement section 405.

The control section 401 controls the entire user terminal 20. The control section 401 controls at least one of, for example, UL signal generation of the transmission signal generating section 402, UL signal mapping of the mapping section 403, DL signal reception processing of the received signal processing section 404 and measurement of the measurement section 405.

Furthermore, the control section 401 performs control such that a signal and/or information are transmitted and received by Time Division Duplex (TDD) by using a plurality of DL/UL frequency band pairs having UL frequency bands and DL frequency bands configured in the frequency direction in the carrier.

For example, the control section 401 performs control to switch between a first DL/UL frequency band pair whose UL frequency band and DL frequency band share the center frequencies, and that is configured unevenly on an upper limit frequency side or a lower limit frequency side in a frequency band of the above carrier, and a second DL/UL frequency band pair whose at least one bandwidth of a UL frequency band and a DL frequency band is wider than a bandwidth of the above first UL/DL frequency band pair, and whose above at least one frequency band includes a frequency band of the above first DL/UL frequency band pair, and perform the above transmission/reception.

In addition, in the above second frequency band pair, the above UL frequency band and the above DL frequency band have different center frequencies, and one frequency band may be included in the other frequency band.

Furthermore, the above transmitting/receiving sections 203 and/or received signal processing sections 404 may not perform transmission/reception outside a frequency band that is specified based on a wider band of the above UL frequency band or the above DL frequency band in the above second frequency band pair.

Furthermore, the control section 401 may share frequency resources to be allocated to uplink control information in the UL frequency band of the above first frequency band pair, and frequency resources to be allocated to uplink control information in the UL frequency band of the above second frequency band pair.

Furthermore, the above transmitting/receiving sections 203 and/or received signal processing section 404 may receive downlink control information of a size that is specified based on a wider bandwidth of the above UL frequency band or the above DL frequency band of the above second frequency band pair.

The control section 401 may perform control to perform radio communication by TDD by using a plurality of DL/UL BWP pairs specified in the above first to fourth aspects and modified example.

The control section 401 can be composed of a controller, a control circuit or a control apparatus described based on the common knowledge in the technical field according to the present invention.

The transmission signal generating section 402 generates (e.g., encodes, rate-matches, punctures or modulates) retransmission control information of a UL signal and a DL signal based on an instruction from the control section 401, and outputs the retransmission control information to the mapping section 403. The transmission signal generating section 402 can be composed of a signal generator, a signal generating circuit or a signal generating apparatus described based on the common knowledge in the technical field according to the present invention.

The mapping section 403 can be composed of a mapper, a mapping circuit or a mapping apparatus described based on the common knowledge in the technical field according to the present invention.

The received signal processing section 404 performs reception processing (e.g., at least one of demapping, demodulation and decoding) on the DL signal. For example, the received signal processing section 404 may demodulate a DL data channel by using a reference signal of an arrangement pattern determined by the control section 401.

Furthermore, the received signal processing section 404 outputs the received signal and/or the signal after the reception processing to the control section 401 and/or the measurement section 405. The received signal processing section 404 outputs, for example, higher layer control information of a higher layer signaling and L1/L2 control information (e.g., a UL grant and/or a DL assignment) to the control section 401.

The received signal processing section 404 can be composed of a signal processor, a signal processing circuit or a signal processing apparatus described based on the common knowledge in the technical field according to the present invention. Furthermore, the received signal processing section 404 can compose the reception section according to the present invention.

The measurement section 405 measures a channel state based on a reference signal (e.g., CSI-RS) from the radio base station 10, and outputs a measurement result to the control section 401. In addition, the measurement section 405 may measure the channel state per CC.

The measurement section 405 can be composed of a signal processor, a signal processing circuit or a signal processing apparatus, and a measurement instrument, a measurement circuit or a measurement apparatus described based on the common knowledge in the technical field according to the present invention.

<Hardware Configuration>

In addition, the block diagrams used to describe the above embodiment illustrate blocks in function units. These function blocks (components) are realized by an optional combination of hardware and/or software. Furthermore, means for realizing each function block is not limited in particular. That is, each function block may be realized by one physically and/or logically coupled apparatus or may be realized by a plurality of these apparatuses formed by connecting two or more physically and/or logically separate apparatuses directly and/or indirectly (by way of, for example, wired connection and/or radio connection).

Figure 16:
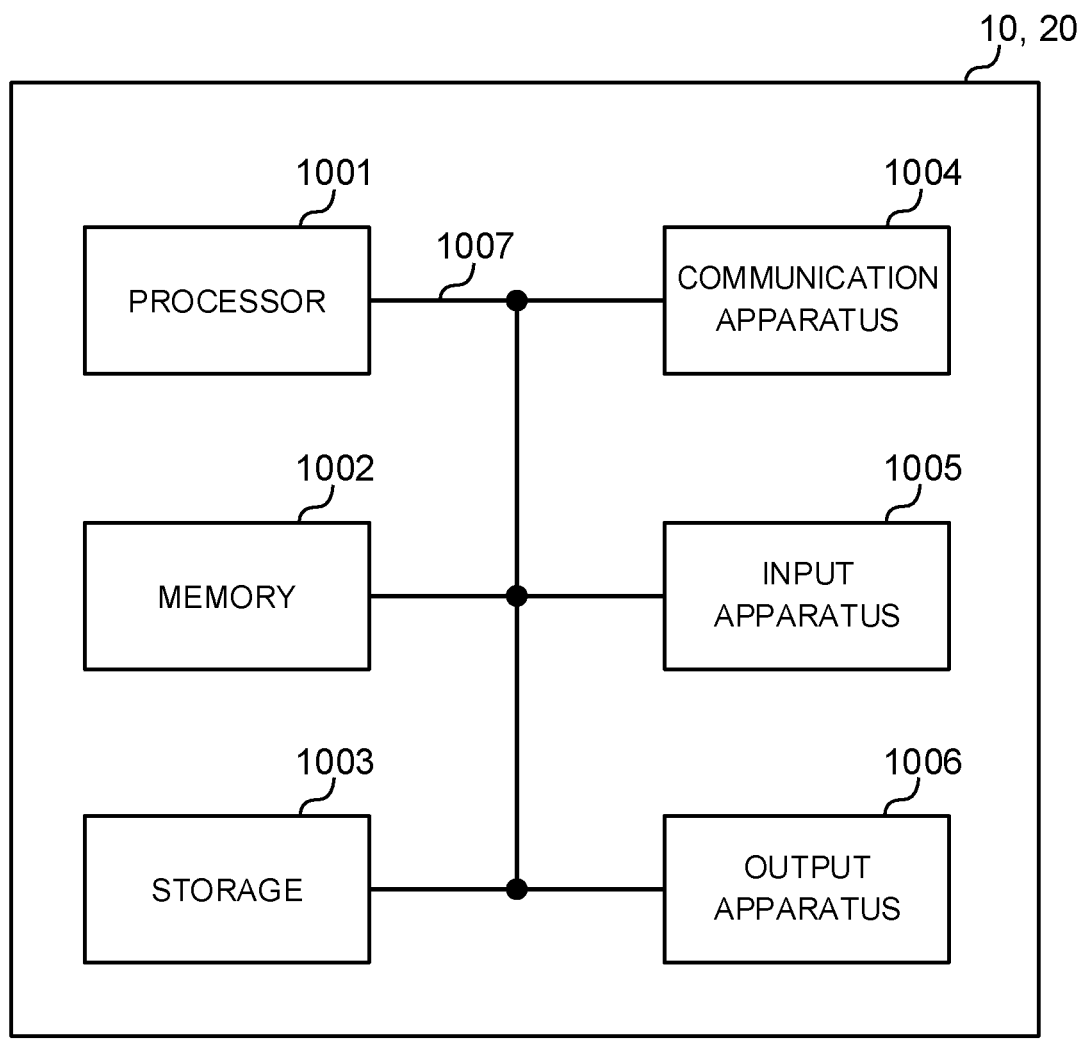
FIG. 16 is a diagram illustrating one example of hardware configurations of the radio base station and the user terminal according to the present embodiment.

For example, the radio base station and the user terminal according to the present embodiment may function as computers that perform processing of the radio communication method according to the present invention. FIG. 16 is a diagram illustrating one example of the hardware configurations of the radio base station and the user terminal according to the present embodiment. The above-described radio base station 10 and user terminal 20 may be each physically configured as a computer apparatus that includes a processor 1001, a memory 1002, a storage 1003, a communication apparatus 1004, an input apparatus 1005, an output apparatus 1006 and a bus 1007.

In this regard, a word "apparatus" in the following description can be read as a circuit, a device or a unit. The hardware configurations of the radio base station 10 and the user terminal 20 may be configured to include one or a plurality of apparatuses illustrated in FIG. 16 or may be configured without including part of the apparatuses.

For example, FIG. 16 illustrates the only one processor 1001. However, there may be a plurality of processors. Furthermore, processing may be executed by 1 processor or processing may be executed by 1 or more processors concurrently or successively or by another method. In addition, the processor 1001 may be implemented by 1 or more chips.

Each function of the radio base station 10 and the user terminal 20 is realized by, for example, causing hardware such as the processor 1001 and the memory 1002 to read given software (program), and thereby causing the processor 1001 to perform an operation, and control at least one of communication of the communication apparatus 1004 and reading and writing of data in the memory 1002 and the storage 1003.

The processor 1001 causes, for example, an operating system to operate to control the entire computer. The processor 1001 may be composed of a Central Processing Unit (CPU) including an interface for a peripheral apparatus, a control apparatus, an operation apparatus and a register. For example, the above-described baseband signal processing section 104 (204) and call processing section 105 may be realized by the processor 1001.

Furthermore, the processor 1001 reads programs (program codes), a software module or data from the storage 1003 and/or the communication apparatus 1004 out to the memory 1002, and executes various types of processing according to these programs, software module or data. As the programs, programs that cause the computer to execute at least part of the operations described in the above-described embodiment are used. For example, the control section 401 of the user terminal 20 may be realized by a control program that is stored in the memory 1002 and operates on the processor 1001, and other function blocks may be also realized likewise.

The memory 1002 is a computer-readable recording medium, and may be composed of at least one of, for example, a Read Only Memory (ROM), an Erasable Programmable ROM (EPROM), an Electrically EPROM (EEPROM), a Random Access Memory (RAM) and other appropriate storage media. The memory 1002 may be referred to as a register, a cache or a main memory (main storage apparatus). The memory 1002 can store programs (program codes) and a software module that can be executed to perform the radio communication method according to the one embodiment of the present invention.

The storage 1003 is a computer-readable recording medium, and may be composed of at least one of, for example, a flexible disk, a floppy (registered trademark) disk, a magnetooptical disk (e.g., a compact disk (Compact Disc ROM (CD-ROM)), a digital versatile disk and a Blu-ray (registered trademark) disk), a removable disk, a hard disk drive, a smart card, a flash memory device (e.g., a card, a stick or a key drive), a magnetic stripe, a database, a server and other appropriate storage media. The storage 1003 may be referred to as an auxiliary storage apparatus.

The communication apparatus 1004 is hardware (transmission/reception device) that performs communication between computers via wired and/or radio networks, and will be also referred to as, for example, a network device, a network controller, a network card and a communication module. The communication apparatus 1004 may be configured to include a high frequency switch, a duplexer, a filter and a frequency synthesizer to realize, for example, Frequency Division Duplex (FDD) and/or Time Division Duplex (TDD). For example, the above-described transmission/reception antennas 101 (201), amplifying sections 102 (202), transmitting/receiving sections 103 (203) and communication path interface 106 may be realized by the communication apparatus 1004.

The input apparatus 1005 is an input device (e.g., a keyboard, a mouse, a microphone, a switch, a button or a sensor) that accepts an input from an outside. The output apparatus 1006 is an output device (e.g., a display, a speaker or a Light Emitting Diode (LED) lamp) that sends an output to the outside. In addition, the input apparatus 1005 and the output apparatus 1006 may be an integrated component (e.g., touch panel).

Furthermore, each apparatus illustrated in FIG. 16 is connected by the bus 1007 that communicates information. The bus 1007 may be composed of a single bus or may be composed of different buses between apparatuses.

Furthermore, the radio base station 10 and the user terminal 20 may be configured to include hardware such as a microprocessor, a Digital Signal Processor (DSP), an Application Specific Integrated Circuit (ASIC), a Programmable Logic Device (PLD) and a Field Programmable Gate Array (FPGA). The hardware may realize part or all of each function block. For example, the processor 1001 may be implemented by at least one of these types of hardware.

MODIFIED EXAMPLE

In addition, each term that has been described in this description and/or each term that is necessary to understand this description may be replaced with terms having identical or similar meanings. For example, a channel and/or a symbol may be signals (signalings). Furthermore, a signal may be a message. A reference signal can be also abbreviated as an RS (Reference Signal), or may be also referred to as a pilot or a pilot signal depending on standards to be applied. Furthermore, a Component Carrier (CC) may be referred to as a cell, a frequency carrier and a carrier frequency.

Furthermore, a radio frame may include one or a plurality of durations (frames) in a time-domain. Each of one or a plurality of durations (frames) that composes a radio frame may be referred to as a subframe. Furthermore, the subframe may include one or a plurality of slots in the time-domain. The subframe may be a fixed time duration (e.g., 1 ms) that does not depend on the numerologies.

Furthermore, the slot may include one or a plurality of symbols (Orthogonal Frequency Division Multiplexing (OFDM) symbols or Single Carrier-Frequency Division Multiple Access (SC-FDMA) symbols) in the time-domain. Furthermore, the slot may be a time unit based on the numerologies. Furthermore, the slot may include a plurality of mini slots. Each mini slot may include one or a plurality of symbols in the time-domain.

The radio frame, the subframe, the slot, the mini slot and the symbol each indicate a time unit for conveying signals. The other corresponding names may be used for the radio frame, the subframe, the slot, the mini slot and the symbol. For example, 1 subframe may be referred to as a Transmission Time Interval (TTI), a plurality of contiguous subframes may be referred to as TTIs, or 1 slot or 1 mini slot may be referred to as a TTI. That is, the subframe and/or the TTI may be a subframe (1 ms) according to legacy LTE, may be a duration (e.g., 1 to 13 symbols) shorter than 1 ms or may be a duration longer than 1 ms.

In this regard, the TTI refers to, for example, a minimum time unit of scheduling for radio communication. For example, in the LTE system, the radio base station performs scheduling for allocating radio resources (a frequency bandwidth and/or transmission power that can be used in each user terminal) in TTI units to each user terminal. In this regard, a definition of the TTI is not limited to this. The TTI may be a transmission time unit of a channel-coded data packet (transport block), or may be a processing unit of scheduling and/or link adaptation. In addition, when 1 slot or 1 mini slot is referred to as a TTI, 1 or more TTIs (i.e., 1 or more slots or 1 or more mini slots) may be a minimum time unit of scheduling. Furthermore, the number of slots (the number of mini slots) that compose a minimum time unit of the scheduling may be controlled.

The TTI having the time duration of 1 ms may be referred to as a general TTI (TTIs according to LTE Rel. 8 to 12), a normal TTI, a long TTI, a general subframe, a normal subframe or a long subframe. A TTI shorter than the general TTI may be referred to as a reduced TTI, a short TTI, a partial or fractional TTI, a reduced subframe or a short subframe.

A Resource Block (RB) is a resource allocation unit of the time-domain and the frequency-domain, and may include one or a plurality of contiguous subcarriers in the frequency-domain. Furthermore, the RB may include one or a plurality of symbols in the time-domain or may have the length of 1 slot, 1 mini slot, 1 subframe or 1 TTI. 1 TTI or 1 subframe may each include one or a plurality of resource blocks. In addition, the RB may be referred to as a Physical Resource Block (PRB: Physical RB), a PRB pair or an RB pair.

Furthermore, the resource block may include one or a plurality of Resource Elements (REs). For example, 1 RE may be a radio resource domain of 1 subcarrier and 1 symbol.

In this regard, structures of the above-described radio frame, subframe, slot, mini slot and symbol are only exemplary structures. For example, configurations such as the number of subframes included in a radio frame, the number of slots per subframe or radio frame, the number of mini slots included in a slot, the number of symbols included in a slot or a mini slot, the number of subcarriers included in an RB, the number of symbols in a TTI, a symbol length and a Cyclic Prefix (CP) length can be variously changed.

Furthermore, the information and parameters described in this description may be expressed by absolute values, may be expressed by relative values with respect to given values or may be expressed by other corresponding information. For example, a radio resource may be instructed by a given index. Furthermore, numerical expressions that use these parameters may be different from those explicitly disclosed in this description.

Names used for parameters in this description are in no respect restrictive ones. For example, various channels (the Physical Uplink Control Channel (PUCCH) and the Physical Downlink Control Channel (PDCCH)) and information elements can be identified based on various suitable names. Therefore, various names assigned to these various channels and information elements are in no respect restrictive ones.

The information and the signals described in this description may be expressed by using one of various different techniques. For example, the data, the instructions, the commands, the information, the signals, the bits, the symbols and the chips mentioned in the above entire description may be expressed as voltages, currents, electromagnetic waves, magnetic fields or magnetic particles, optical fields or photons, or optional combinations of these.

Furthermore, the information and the signals can be output from a higher layer to a lower layer and/or from the lower layer to the higher layer. The information and the signals may be input and output via a plurality of network nodes.

The input and output information and signals may be stored in a specific location (e.g., memory) or may be managed by a management table. The information and signals to be input and output can be overwritten, updated or additionally written. The output information and signals may be deleted. The input information and signals may be transmitted to other apparatuses.

Notification of information is not limited to the aspects/ embodiment described in this description and may be performed by other methods. For example, the information may be notified by a physical layer signaling (e.g., Downlink Control Information (DCI) and Uplink Control Information (UCI)), a higher layer signaling (e.g., a Radio Resource Control (RRC) signaling, broadcast information (a Master Information Block (MIB) and a System Information Block (SIB)), and a Medium Access Control (MAC) signaling), other signals or combinations of these.

In addition, the physical layer signaling may be referred to as Layer 1/Layer 2 (L1/L2) control information (L1/L2 control signal) or L1 control information (L1 control signal). Furthermore, the RRC signaling may be referred to as an RRC message, and may be, for example, an RRCConnectionSetup message or an RRCConnectionReconfiguration message. Furthermore, the MAC signaling may be notified by, for example, an MAC Control Element (MAC CE).

Furthermore, notification of given information (e.g., notification of "being X") is not limited to explicit notification, and may be performed implicitly (by, for example, not notifying this given information or by notifying another information).

Decision may be made based on a value (0 or 1) expressed as 1 bit, may be made based on a boolean expressed as true or false or may be made by comparing numerical values (by, for example, making comparison with a given value).

Irrespectively of whether software is referred to as software, firmware, middleware, a microcode or a hardware description language or is referred to as other names, the software should be widely interpreted to mean a command, a command set, a code, a code segment, a program code, a program, a subprogram, a software module, an application, a software application, a software package, a routine, a subroutine, an object, an executable file, an execution thread, a procedure or a function.

Furthermore, software, commands and information may be transmitted and received via transmission media. When, for example, the software is transmitted from websites, servers or other remote sources by using wired techniques (e.g., coaxial cables, optical fiber cables, twisted pairs and Digital Subscriber Lines (DSLs)) and/or radio techniques (e.g., infrared rays and microwaves), these wired techniques and/or radio techniques are included in a definition of the transmission media.

The terms "system" and "network" used in this description are compatibly used.

In this description, the terms "Base Station (BS)", "radio base station", "eNB", "gNB", "cell", "sector", "cell group", "carrier" and "component carrier" can be compatibly used. The base station will be also referred to as a term such as a fixed station, a NodeB, an eNodeB (eNB), an access point, a transmission point, a reception point, a femtocell or a small cell in some cases.

The base station can accommodate one or a plurality of (e.g., three) cells (also referred to as sectors). When the base station accommodates a plurality of cells, an entire coverage area of the base station can be partitioned into a plurality of smaller areas. Each smaller area can also provide communication service via a base station subsystem (e.g., indoor small base station (RRH: Remote Radio Head)). The term "cell" or "sector" indicates part or the entirety of the coverage area of the base station and/or the base station subsystem that provide communication service in this coverage.

In this description, the terms "Mobile Station (MS)", "user terminal", "User Equipment (UE)" and "terminal" can be compatibly used. The base station will be also referred to as a term such as a fixed station, a NodeB, an eNodeB (eNB), an access point, a transmission point, a reception point, a femtocell or a small cell in some cases.

The mobile station will be also referred to by a person skilled in the art as a subscriber station, a mobile unit, a subscriber unit, a wireless unit, a remote unit, a mobile device, a wireless device, a wireless communication device, a remote device, a mobile subscriber station, an access terminal, a mobile terminal, a wireless terminal, a remote terminal, a handset, a user agent, a mobile client, a client or some other appropriate terms in some cases.

Furthermore, the radio base station in this description may be read as the user terminal. For example, each aspect/ embodiment of the present invention may be applied to a configuration where communication between the radio base station and the user terminal is replaced with communication between a plurality of user terminals (D2D: Device-to-Device). In this case, the user terminal 20 may be configured to include the functions of the above-described radio base station 10. Furthermore, "uplink" and/or "downlink" may be read as a "side". For example, the uplink channel may be read as a side channel.

Similarly, the user terminal in this description may be read as the radio base station. In this case, the radio base station 10 may be configured to include the functions of the above-described user terminal 20.

In this description, specific operations performed by the base station are performed by an upper node of this base station depending on cases. Obviously, in a network including one or a plurality of network nodes including the base stations, various operations performed to communicate with a terminal can be performed by base stations, one or more network nodes (that are supposed to be, for example, Mobility Management Entities (MMEs) or Serving-Gateways (S-GWs) yet are not limited to these) other than the base stations or a combination of these.

Each aspect/embodiment described in this description may be used alone, may be used in combination or may be switched and used when carried out. Furthermore, orders of the processing procedures, the sequences and the flowchart according to each aspect/embodiment described in this description may be rearranged unless contradictions arise. For example, the method described in this description presents various step elements in an exemplary order and is not limited to the presented specific order.

Each aspect/embodiment described in this description may be applied to Long Term Evolution (LTE), LTE-Advanced (LTE-A), LTE-Beyond (LTE-B), SUPER 3G, IMT-Advanced, the 4th generation mobile communication system (4G), the 5th generation mobile communication system (5G), Future Radio Access (FRA), the New Radio Access Technology (New-RAT), New Radio (NR) New radio access (NX), Future generation radio access (FX), Global System for Mobile communications (GSM) (registered trademark), CDMA2000, Ultra Mobile Broadband (UMB), IEEE 802.11 (Wi-Fi (registered trademark)), IEEE 802.16 (WiMAX (registered trademark)), IEEE 802.20, Ultra-WideBand (UWB), Bluetooth (registered trademark), systems that use other appropriate radio communication methods and/or next-generation systems that are expanded based on these systems.

The phrase "based on" used in this description does not mean "based only on" unless specified otherwise. In other words, the phrase "based on" means both of "based only on" and "based at least on".

Every reference to elements that use names such as "first" and "second" used in this description does not generally limit the quantity or the order of these elements. These names can be used in this description as a convenient method for distinguishing between two or more elements. Hence, the reference to the first and second elements does not mean that only two elements can be employed or the first element should precede the second element in some way.

The term "deciding (determining)" used in this description includes diverse operations in some cases. For example, "deciding (determining)" may be regarded to "decide (determine)" calculating, computing, processing, deriving, investigating, looking up (e.g., looking up in a table, a database or another data structure) and ascertaining. Furthermore, "deciding (determining)" may be regarded to "decide (determine)" receiving (e.g., receiving information), transmitting (e.g., transmitting information), input, output and accessing (e.g., accessing data in a memory). Furthermore, "deciding (determining)" may be regarded to "decide (determine)" resolving, selecting, choosing, establishing and comparing. That is, "deciding (determining)" may be regarded to "decide (determine)" some operation.

The words "connected" and "coupled" used in this description or every modification of these words can mean every direct or indirect connection or coupling between 2 or more elements, and can include that 1 or more intermediate elements exist between the two elements "connected" or "coupled" with each other. Elements may be coupled or connected physically or logically or by way of a combination of physical and logical coupling or connection. It can be understood that, when used in this description, the two elements are "connected" or "coupled" with each other by using 1 or more electric wires, cables and/or printed electrical connection, and by using electromagnetic energy having wavelengths in radio frequency domains, microwave domains and (both of visible and invisible) light domains in some non-restrictive and non-comprehensive examples.

When the words "including" and "comprising" and modifications of these words are used in this description or the claims, these words intend to be comprehensive similar to the word "having". Furthermore, the word "or" used in this description or the claims intends not to be an exclusive OR.

The present invention has been described in detail above. However, it is obvious for a person skilled in the art that the present invention is not limited to the embodiment described in this description. The present invention can be carried out as modified and changed aspects without departing from the gist and the scope of the present invention defined by the recitation of the claims. Accordingly, the disclosure of this description is intended for exemplary explanation, and does not have any restrictive meaning to the present invention.

The invention claimed is:

1. A terminal comprising:
a transceiver that performs transmission and reception by Time Division Duplex (TDD) by using a DL/UL frequency band pair that has a UL frequency band and a DL frequency band configured in a frequency direction in a carrier; and
a processor that configures and controls switching between a first DL/UL frequency band pair and a second DL/UL frequency band pair, wherein:
the first DL/UL frequency band pair includes a first UL frequency band and a first DL frequency band,
the first UL frequency band and the first DL frequency band are both configured with a first center frequency and a first bandwidth,
the first center frequency is shifted away from a center frequency of the carrier,
the second DL/UL frequency band pair includes a second UL frequency band and a second DL frequency band,
at least one of the second UL frequency band and the second DL frequency band has a wider bandwidth than the first bandwidth and has a frequency band including a frequency band of the first DL/UL frequency band pair, and
the second UL frequency band and the second DL frequency band are configured with different center frequencies and different bandwidths.

2. The terminal according to claim 1, wherein one of the second UL frequency band and the second DL frequency band is included in the other one of the second UL frequency band and the second DL frequency band.

3. The terminal according to claim 2, wherein the transceiver does not perform transmission and reception outside a frequency band specified based on a wider bandwidth of the second UL frequency band or the second DL frequency band.

4. The terminal according to claim 2, wherein the processor shares a frequency resource to be allocated to uplink control information in the first UL frequency band, and a frequency resource to be allocated to the uplink control information in the second UL frequency band.

5. The terminal according to claim 2, wherein the transceiver receives downlink control information of a size specified based on a wider bandwidth of the second UL frequency band or the second DL frequency band.

6. The terminal according to claim 1, wherein the transceiver does not perform transmission and reception outside a frequency band specified based on a wider bandwidth of the second UL frequency band or the second DL frequency band.

7. The terminal according to claim 6, wherein the processor shares a frequency resource to be allocated to uplink control information in the first UL frequency band, and a frequency resource to be allocated to the uplink control information in the second UL frequency band.

8. The terminal according to claim 6, wherein the transceiver receives downlink control information of a size specified based on a wider bandwidth of the second UL frequency band or the second DL frequency band.

9. The terminal according to claim 1, wherein the processor shares a frequency resource to be allocated to uplink control information in the first UL frequency band, and a frequency resource to be allocated to the uplink control information in the second UL frequency band.

10. The terminal according to claim 9, wherein the transceiver receives downlink control information of a size specified based on a wider bandwidth of the second UL frequency band or the second DL frequency band.

11. The terminal according to claim 1, wherein the transceiver receives downlink control information of a size specified based on a wider bandwidth of the UL frequency band or the second DL frequency band.

12. A communication method of a terminal comprising:
performing transmission and reception by Time Division Duplex (TDD) by using a DL/UL frequency band pair that has a UL frequency band and a DL frequency band configured in a frequency direction in a carrier; and
configuring and controlling switching between a first DL/UL frequency band pair and a second DL/UL frequency band pair, wherein:
the first DL/UL frequency band pair includes a first UL frequency band and a first DL frequency band,
the first UL frequency band and the first DL frequency band are both configured with a first center frequency and a first bandwidth,
the first center frequency is shifted away from a center frequency of the carrier,
the second DL/UL frequency band pair includes a second UL frequency band and a second DL frequency band,
at least one of the second UL frequency band and the second DL frequency band has a wider bandwidth than the first bandwidth and has a frequency band including a frequency band of the first DL/UL frequency band pair, and
the second UL frequency band and the second DL frequency band are configured with different center frequencies and different bandwidths.

\* \* \* \* \*